United States Patent
Irie et al.

(10) Patent No.: US 12,020,523 B2
(45) Date of Patent: Jun. 25, 2024

(54) GATE APPARATUS, MANAGEMENT SERVER, EMIGRATION AND IMMIGRATION EXAMINATION SYSTEM, AND EMIGRATION AND IMMIGRATION EXAMINATION METHOD

(71) Applicant: NEC Corporation, Tokyo (JP)

(72) Inventors: Fumi Irie, Tokyo (JP); Yoshitaka Yoshimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 17/796,890

(22) PCT Filed: Feb. 18, 2020

(86) PCT No.: PCT/JP2020/006219
§ 371 (c)(1),
(2) Date: Aug. 2, 2022

(87) PCT Pub. No.: WO2021/166066
PCT Pub. Date: Aug. 26, 2021

(65) Prior Publication Data
US 2023/0056195 A1    Feb. 23, 2023

(51) Int. Cl.
*G07C 9/10*    (2020.01)
*G07C 9/25*    (2020.01)
*G07C 9/27*    (2020.01)

(52) U.S. Cl.
CPC ............... *G07C 9/10* (2020.01); *G07C 9/257* (2020.01); *G07C 9/27* (2020.01)

(58) Field of Classification Search
CPC ............. G07C 9/10; G07C 9/27; G07C 9/257
USPC ........................................................ 340/5.2
See application file for complete search history.

(56) References Cited

U.S. PATENT DOCUMENTS

| | | | |
|---|---|---|---|
| 9,946,556 B2 * | 4/2018 | Kim ................. | G06K 19/06112 |
| 2013/0195316 A1 * | 8/2013 | Bataller ............... | G06V 40/172 |
| | | | 382/103 |
| 2015/0088775 A1 | 3/2015 | Mcintire et al. | |
| 2023/0060106 A1 * | 2/2023 | Irie ......................... | G07C 9/10 |

FOREIGN PATENT DOCUMENTS

| | | |
|---|---|---|
| CN | 102568064 A | 7/2012 |
| JP | 2016-053896 A | 4/2016 |
| JP | 2016-524189 A | 8/2016 |

(Continued)

OTHER PUBLICATIONS

International Search Report for PCT Application No. PCT/JP2020/006219, dated May 12, 2020.

(Continued)

*Primary Examiner* — Kam Wan Ma

(57) ABSTRACT

A gate apparatus includes a communication unit, and a switching unit. The communication unit communicates with a management server, which calculates a ratio of users of a first nationality in a total number of users undergoing emigration and immigration examination and determines an operating mode of a gate apparatus based on the calculated ratio of users. The switching unit switches an operating mode for emigration and immigration examination of an examination target user to the operating mode determined by the management server.

11 Claims, 17 Drawing Sheets

(56) References Cited

FOREIGN PATENT DOCUMENTS

| JP | 2018-109935 A | 7/2018 |
|----|---------------|--------|
| JP | 2019-071126 A | 5/2019 |

OTHER PUBLICATIONS

Written opinion for PCT Application No. PCT/JP2020/006219, dated May 12, 2020.
Measures for Safety of IC Passports described in https://www.mofa.go.jp/mofaj/toko/passport/ic_faq.html#11.
Extended European Search Report for EP Application No. 20919574.2, dated on Feb. 28, 2023.

* cited by examiner

FIG. 4

GATE USER DATABASE

| BIOLOGICAL INFORMATION | MRZ INFORMATION |
|---|---|
| FV1 | MRZ01 |
| FV2 | MRZ02 |
| FV3 | MRZ03 |
| ... | ... |

MATCHING SERVER

FIG. 7

TRAVELER DATABASE

| PASSPORT INFORMATION | | | | | FLIGHT INFORMATION | | | | | | |
|---|---|---|---|---|---|---|---|---|---|---|---|
| COUNTRY OF ISSUE | PASSPORT NUMBER | NAME | NATIONALITY | ... | AIRLINE NAME | FLIGHT NUMBER | PLACE OF DEPARTURE | PLACE OF ARRIVAL | DATE AND TIME OF DEPARTURE | DATE AND TIME OF ARRIVAL | ... |
| A1 | A2 | A3 | A4 | ... | X1 | X2 | X3 | X4 | ○MM/○DD 0:00 | ○MM/○DD 12:00 | ... |
| B1 | B2 | B3 | B4 | ... | X1 | X2 | X3 | X4 | ×MM/×DD 0:00 | ×MM/×DD 12:00 | ... |
| C1 | C2 | C3 | C4 | ... | X1 | X2 | X3 | X4 | △MM/△DD 0:00 | △MM/△DD 12:00 | ... |
| ... | ... | ... | ... | ... | ... | ... | ... | ... | ... | ... | ... |

FIG. 8

| USER RATIO (JAPANESE RATIO) | NUMBER OF GATE APPARATUSES 10 FOR JAPANESE EXAMINATION MODE |
|---|---|
| 90%~ | A1 |
| 80%~90% | A2 |
| 70%~80% | A3 |
| ... | ... |

MATCHING REQUEST

FIG. 12

FOR COLLECTING OF YOUR FINGERPRINTS

PLACE YOUR BOTH HANDS ON A FINGERPRINT SCANNER.

FIG. 13

| OPERATION MODE | NATIONALITY | DETERMINATION OF PASSPORT | FINGERPRINT | OPERATION |
|---|---|---|---|---|
| JAPANESE | JAPAN | CORRECT PASSPORT | ― | OPENING GATE |
| JAPANESE | FOREIGN COUNTRY | ― | ― | OUTPUT MESSAGE |
| FOREIGNER | FOREIGN COUNTRY | CORRECT PASSPORT | ACQUISITION SUCCESS | OPENING GATE |
| FOREIGNER | JAPAN | CORRECT PASSPORT | ― | OUTPUT MESSAGE |

GATE APPARATUS, MANAGEMENT SERVER, EMIGRATION AND IMMIGRATION EXAMINATION SYSTEM, AND EMIGRATION AND IMMIGRATION EXAMINATION METHOD

This application is a National Stage Entry of PCT/JP2020/006219 filed on Feb. 18, 2020, the contents of all of which are incorporated herein by reference, in their entirety.

TECHNICAL FIELD

The present invention relates to a gate apparatus, a management server, an emigration and immigration examination system, and an emigration and immigration examination method.

BACKGROUND ART

Immigration examination is performed at airports. An officer in charge of the immigration examination compares a photograph of a face attached to a passport and the face of a person in front of the officer. If the face image in the passport does not match the face of the person in front of the officer, the emigration and immigration of the person is not permitted.

In addition, in recent years, apparatuses that automatically perform the above immigration examination have been introduced. For example, a gate apparatus disclosed in PTL 1 performs matching between a face image attached to a passport and a face image of a person standing in front of the gate apparatus and examines emigration and immigration of the person based on the result of the matching.

CITATION LIST

Patent Literature

[PTL 1] Japanese Unexamined Patent Application Publication No. 2019-071126

SUMMARY OF INVENTION

Technical Problem

Immigration examinations in Japan differ depending on nationality of a person to be examined. Specifically, fingerprints are not required at immigration checkpoints for persons of Japanese nationality (Japanese). In contrast, fingerprints are required at immigration checkpoints for persons of foreign nationality (foreigners).

In this way, the immigration examination process differs depending on the nationality of the person to be examined. Naturally, the apparatus that automatically performs the immigration examination (hereinafter referred to as an "automatic immigration examination apparatus") is required also to be compatible with the above differences in examination contents. Therefore, it is necessary that the automatic immigration apparatus for Japanese and the automatic immigration apparatus for foreigners are installed in immigration area. However, such a setting is not acceptable in immigration examination areas where space is limited. Under circumstances where the nationalities of users are unevenly distributed by time of day, etc., installing a large number of infrequently used apparatuses will reduce an efficiency (throughput) of the entire immigration examination system.

To solve the above problem, a single automated immigration examination apparatus could handle both Japanese and foreign nationals. However, since the examination process differs according to nationality, the time required for the automated immigration examination apparatus to complete the examination process also differs according to nationality. Therefore, it causes frustration for users waiting for examination (those waiting in line at the automated immigration examination apparatus). The person waiting for the examination does not know which of several apparatuses will be completed earlier. As a result, users who line up for an apparatus with a slower examination process will be dissatisfied with a presence of an apparatus that completes examination earlier than the one they have selected. Because of these problems, it is problematic for a single automated immigration examination apparatus to simultaneously enable examination functions for users of different nationalities.

The present invention contributes to efficiency of an immigration examination system, and it is a principal object of the present invention to provide a gate apparatus, a management server, an emigration and immigration examination system, and an emigration and immigration examination method.

Solution to Problem

According to a first aspect of the present invention, there is provided a gate apparatus, including: a communication unit that communicates with a management server, which calculates a ratio of users of a first nationality in a total number of users undergoing emigration and immigration examination and determines an operating mode of a gate apparatus based on the calculated ratio of users; and a switching unit that switches an operating mode for emigration and immigration examination of an examination target user to the operating mode determined by the management server.

According to a second aspect of the present invention, there is provided a management server, calculating a ratio of users of a first nationality in a total number of users undergoing emigration and immigration examination; determining an operating mode of at least one or more gate apparatus based on the calculated ratio of users; and notifying the at least one or more gate apparatus of the determined operating mode.

According to a third aspect of the present invention, there is provided an emigration and immigration examination system, including: at least one or more gate apparatus that examines emigration and immigration of users; and a management server that calculates a ratio of users of a first nationality in a total number of users undergoing emigration and immigration examination, and determines an operating mode of the at least one or more gate apparatus based on the calculated ratio of users, wherein the management server notifies the at least one or more gate apparatus of the determined operating mode; and the gate apparatus examines the emigration and immigration of an examination target user in the notified operating mode.

According to a fourth aspect of the present invention, there is provided an emigration and immigration examination method in a system including at least one or more gate apparatus that examines emigration and immigration of users and a management server connected to the at least one or more gate apparatus, the emigration and immigration examination method including: calculating a ratio of users of a first nationality in a total number of users undergoing emigration and immigration examination, and determining an operating mode of the at least one or more gate apparatus based on the calculated ratio or users; notifying the at least one or more gate apparatus of the determined operating mode; and examining the emigration and immigration of an examination target user in the notified operating mode.

Advantageous Effects of Invention

According to the individual aspects of the present invention, there are provided a gate apparatus, a management server, an emigration and immigration examination system, and an emigration and immigration examination method that contribute to efficiency of an immigration examination system. The advantageous effects of the present invention are not limited to the above advantageous effect. The present invention may provide other advantageous effects, instead of or in addition to the above advantageous effect.

BRIEF DESCRIPTION OF THE DRAWINGS

FIG. 4 is a diagram illustrating an example of a gate user database.

FIG. 7 is a diagram illustrating an example of a traveler database.

FIG. 8 is a diagram illustrating an operation of an operating mode determination unit of the first example embodiment.

FIG. 12 is a diagram illustrating an operation of a fingerprint acquisition unit of the first example embodiment.

FIG. 13 is a diagram illustrating an operation of a gate control unit of the first example embodiment.

EXAMPLE EMBODIMENT

Figure 1:
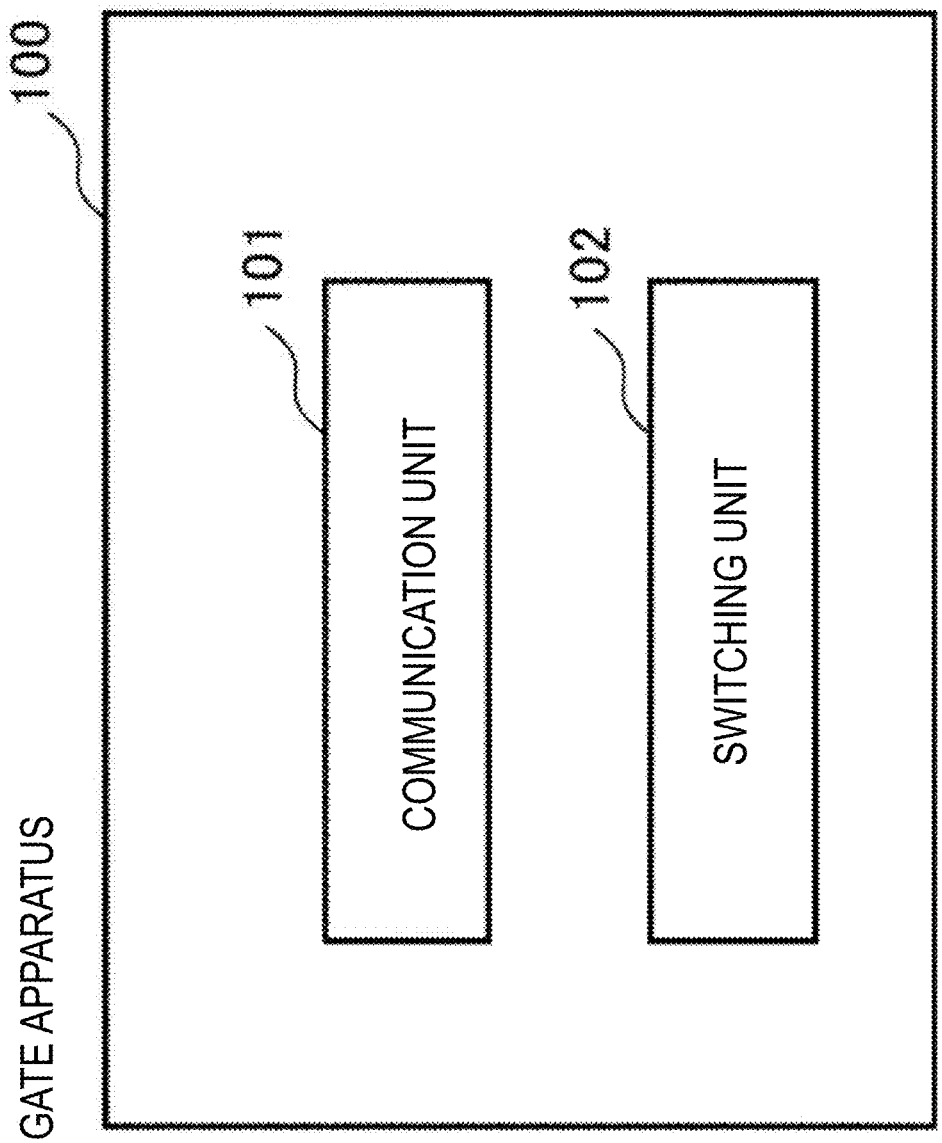
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

A gate apparatus 100 according to an example embodiment includes a communication unit 101, and a switching unit 102 (see FIG. 1). The communication unit 101 communicates with a management server, which calculates a ratio of users of a first nationality in a total number of users undergoing emigration and immigration examination and determines an operating mode of a gate apparatus based on the calculated ratio of users. The switching unit 102 switches an operating mode for emigration and immigration examination of an examination target user to the operating mode determined by the management server.

In the emigration and immigration examination system that includes the above management server, the management server calculates the ratio of users of a particular nationality to the total number of users in a particular period of time. The management server switches the operating mode (for example, a first operating mode for Japanese examination, a second operating mode for foreigner examination) of the gate apparatus 100 based on the calculated ratio. If the management server anticipates that a number of users of the first nationality (for example, Japanese) undergoing emigration and immigration examination will increase, the management server increases a number of the gate apparatuses 100 that are responsible for emigration and immigration examination about users of the first nationality. If the management server anticipates that a number of users of a second nationality (nationality other than the first nationality; for example, foreign nationals) undergoing emigration and immigration examination will increase, the management server increases a number of the gate apparatuses 100 that are responsible for emigration and immigration examination about users of the second nationality. The management server can improve a throughput of the emigration and immigration examination system by appropriately selecting the operating mode of the gate apparatus 100 according to the above calculated user ratio.

Hereinafter, specific example embodiments will be described in more detail with reference to drawings.

First Example Embodiment

A first example embodiment will be described in more detail with reference to drawings.

Figure 2:
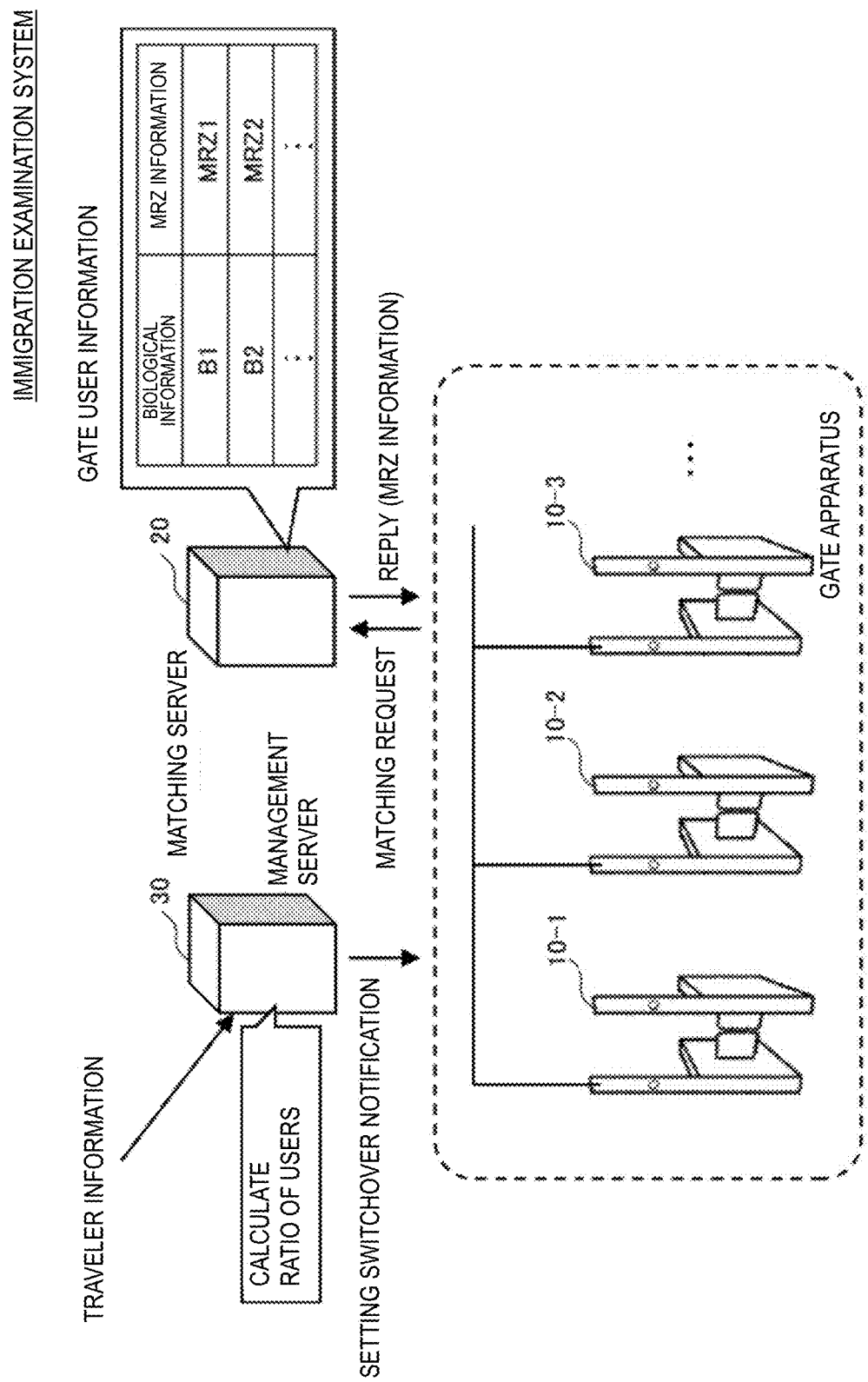
FIG. 2 is a diagram illustrating an example of a schematic configuration of an immigration examination system according to a first example embodiment.

FIG. 2 is a diagram illustrating an example of a schematic configuration of an immigration examination system according to the first example embodiment. As illustrated in FIG. 2, the immigration examination system includes a plurality of gate apparatuses 10-1 to 10-3, a matching server 20, and a management server 30.

In the following description, unless there is a particular reason to distinguish the gate apparatuses 10-1 to 10-3 from each other, any one of these gate apparatuses 10-1 to 10-3 will simply be referred to as a "gate apparatus 10". In addition, while three gate apparatuses 10 are illustrated in FIG. 2, the number of gate apparatuses 10 included in the system is not of course limited to any particular number. The immigration examination system includes at least one gate apparatus 10.

The individual gate apparatus 10 is an apparatus that automatically performs an emigration and immigration examination procedure for users. The gate apparatus 10 includes a gate that can be opened and closed. If the gate apparatus 10 determines that a person located in front of the gate apparatus 10 passes through an immigration examination, the gate apparatus 10 opens the gate and permits the user to pass through the gate. In this way, the gate apparatus 10 controls the gate based on the result of the immigration examination of the user.

The gate apparatus 10 supports immigration examinations with different examination contents. Specifically, the gate apparatus 10 has a function of automatically performing immigration examination for Japanese nationals and immigration examination for foreigners. The gate apparatus 10 does not enable these two functions simultaneously (in parallel), but enables one of them for the immigration examination. In the following description, an operation mode for automatically performing the immigration examinations for Japanese nationals will be referred to as "Japanese examination mode" and an operation mode for automatically performing the immigration examinations for foreign nationals will be referred to as "foreigner examination mode".

The matching server 20 is an apparatus that realizes the immigration examination by the above gate apparatus 10. For example, the matching server 20 stores information about users who can use the gate apparatus 10 (the information will hereinafter be referred to as gate user information). Specifically, the matching server 20 stores biological information about users and information written in Machine Readable Zones (MRZs) in passports issued to the users (the information will hereinafter be referred to as MRZ information) in association with each other.

For example, the biological information about a user is data (feature values) calculated from physical features unique to this individual user. The physical features are the face, a fingerprint, a voiceprint, a vein, a retina, or an iris pattern of an eye of the user. Alternatively, the biological information about a user may be, for example, image data of a face image or a fingerprint image of the user. Any information including physical features of a user may be used as the biological information about the user.

The information (MRZ information) written in an MRZ in a passport includes the name, the nationality, the gender, the date of birth of the user, the passport number, the validity period, etc.

The management server 30 is an apparatus that manages an operating mode of the gate apparatus 10. The management server 30 determines the operating mode of the gate apparatus 10 based on a percentage of nationalities of the users who are expected to undergo an immigration examination. More specifically, the management server 30 determines the gate apparatuses 10, out of the gate apparatuses 10 in operation, whose the operating mode is switched based on a percentage of users' nationalities (nationality ratio). The management server 30 notifies (sets) the gate apparatus 10 of the determined operating mode. In the following explanation, a percentage of users of a particular nationality who are expected to undergo the immigration examination (a percentage of Japanese among all users or a percentage of foreigners among all users) will be referred to as the "user rate of a particular nationality" or simply "user ratio".

The gate apparatuses 10, the matching server 20, and the management server 30 can communicate with each other via wired or wireless communication means. The matching server 20 and the management server 30 may be placed in the same airport where the gate apparatuses 10 are placed. Alternatively, the matching server 20 and the management server 30 may be placed on a network (cloud). In FIG. 2, the matching server 20 and the management server 30 are described as different apparatuses, but they may be implemented in the same apparatus.

[Operation in Immigration Examination System]

Next, a schematic operation in the immigration examination system according to the first example embodiment will be described with reference to FIG. 2.

The management server 30 acquires the traveler information from airlines. Based on the acquired traveler information, the management server 30 calculates percentages related to a number of Japanese and a number of foreign nationals among users targeted for the immigration examination.

Here, a ratio of Japanese to all users as the user rate of the particular nationality (user ratio, Japanese ratio) is calculated. However, an intent is not to limit the calculation of the user ratio. A percentage of foreign nationals may be calculated as the user ratio. Alternatively, the user rate of the particular nationality may be a ratio of a number of foreign nationals to a number of Japanese nationals undergoing the immigration examination. Alternatively, the user ratio of the particular nationality may be the ratio of the number of Japanese nationals to the number of foreigners.

The management server 30 determines the operating mode of the gate apparatus 10 based on the user ratio. For example, if a percentage of Japanese is high, the management server 30 increases a number of the gate apparatus 10 operating in Japanese examination mode.

The management server 30 reflects the determined operating mode in the operation of each of the gate apparatuses 10. Specifically, the management server 30 sends a "setting switchover notification" to the gate apparatus 10 whose operating mode is to be changed among the plurality of the gate apparatuses 10. Upon receiving the notification, the gate apparatus 10 switches its operating mode and performs the immigration examination of the user with the newly set operating mode.

The gate apparatus 10 displays its own operation mode so that the users (users waiting for examination) can confirm it. For example, the gate apparatus 10 displays messages according to an operation mode on a display provided on a ceiling portion attached to a main body or a support portion (pillar) extending vertically upward from the main body. For example, if the gate apparatus 10 is operating in Japanese examination mode, the gate apparatus 10 displays something like "Automatic Japanese examination is available" on the above display. Similarly, when operating in the foreigner examination mode, the gate apparatus 10 provides a message in a language that foreigners can understand (for example, English), such as "Automatic foreigner examination is available". Alternatively, the gate apparatus 10 displays a message such as "Automatic foreigners examination is available" while switching languages (for example, English, Chinese).

The gate user information about a user of the immigration examination system is registered in the matching server 20, for example, before departure of the user. That is, the gate user information about a user is registered in the matching server 20 before his or her departure date or before departure on his or her departure date. The matching server 20 includes a database for storing the gate user information, and after a user registers his or her gate user information, an entry corresponding to this user is added in the database. Hereinafter, the database for storing the gate user information will be referred to as a "gate user database". In the gate user database, biological information about at least one user and MRZ information written in a machine readable zone in the passport issued to the at least one user is stored in association with each other.

A user visits the airport on the departure date. After the user completes boarding procedures such as a check-in procedure and a security check procedure, the user boards an aircraft. When the aircraft carrying the user arrives at the arrival airport (the airport where the gate apparatus 10 is installed), the user moves to the area where the gate apparatus 10 is installed (immigration examination area).

When the user arrives at the immigration examination area, the user moves to the gate apparatus 10.

When the user comes close to the gate apparatus 10 (when the distance between the user and the gate apparatus 10 reaches a predetermined distance or less), the gate apparatus 10 acquires (generates) biological information from the user. The biological information acquired by the gate apparatus 10 is the same kind of information as the biological information registered as the gate user information in the matching server 20.

The gate apparatus 10 transmits the acquired biological information to the matching server 20. More specifically, the gate apparatus 10 transmits a "matching request" including the acquired biological information to the matching server 20.

The matching server 20 searches the gate user database by using the received biological information as a key and determines the MRZ information corresponding to the received biological information. The matching server 20 transmits a reply (a reply to the matching request) including the determined MRZ information to the gate apparatus 10.

The gate apparatus 10 determines the nationality of the examination target user based on the acquired MRZ information. As mentioned above, since the MRZ information includes the nationality of a passport holder, the gate apparatus 10 can know the nationality of the user from the MRZ information.

When the user arrives at the gate apparatus 10, the user holds his or her passport on a reader (a reader 316 to be described below) of the gate apparatus 10 (brings his or her passport into contact with a reader). That is, the user brings his or her passport into contact with a reader of the gate apparatus 10 in the same way as people bring their transportation IC (Integrated Circuit) cards into contact with card readers at ticket gates in stations.

The gate apparatus 10 attempts to read out information written in an IC chip in the passport via the reader. If the gate apparatus 10 succeeds in reading out the information written in the IC chip by using the MRZ information acquired from the matching server 20, the gate apparatus 10 determines that the user possesses a correct passport and opens the gate.

The gate apparatus 10 opens the gate if the operating mode is "Japanese examination mode", the nationality obtained from the MRZ information is "Japanese", and the user in question is in possession of a correct passport.

If the operating mode is "foreigner examination mode" and the nationality obtained from the MRZ information is "other than Japan (foreign country)," the gate apparatus 10 attempts to collect fingerprints using a fingerprint scanner.

The gate apparatus 10 opens the gate if the fingerprints are taken without image quality problems and the user in question (foreign user) is in possession of a correct passport.

The user passes through the gate, and the immigration examination ends.

Next, the individual apparatuses included in the immigration examination system according to the first example embodiment will be described in detail. The following description will be made based on an example in which information about faces of people is used as the biological information registered in the matching server 20.

[Matching Server]

Figure 3:
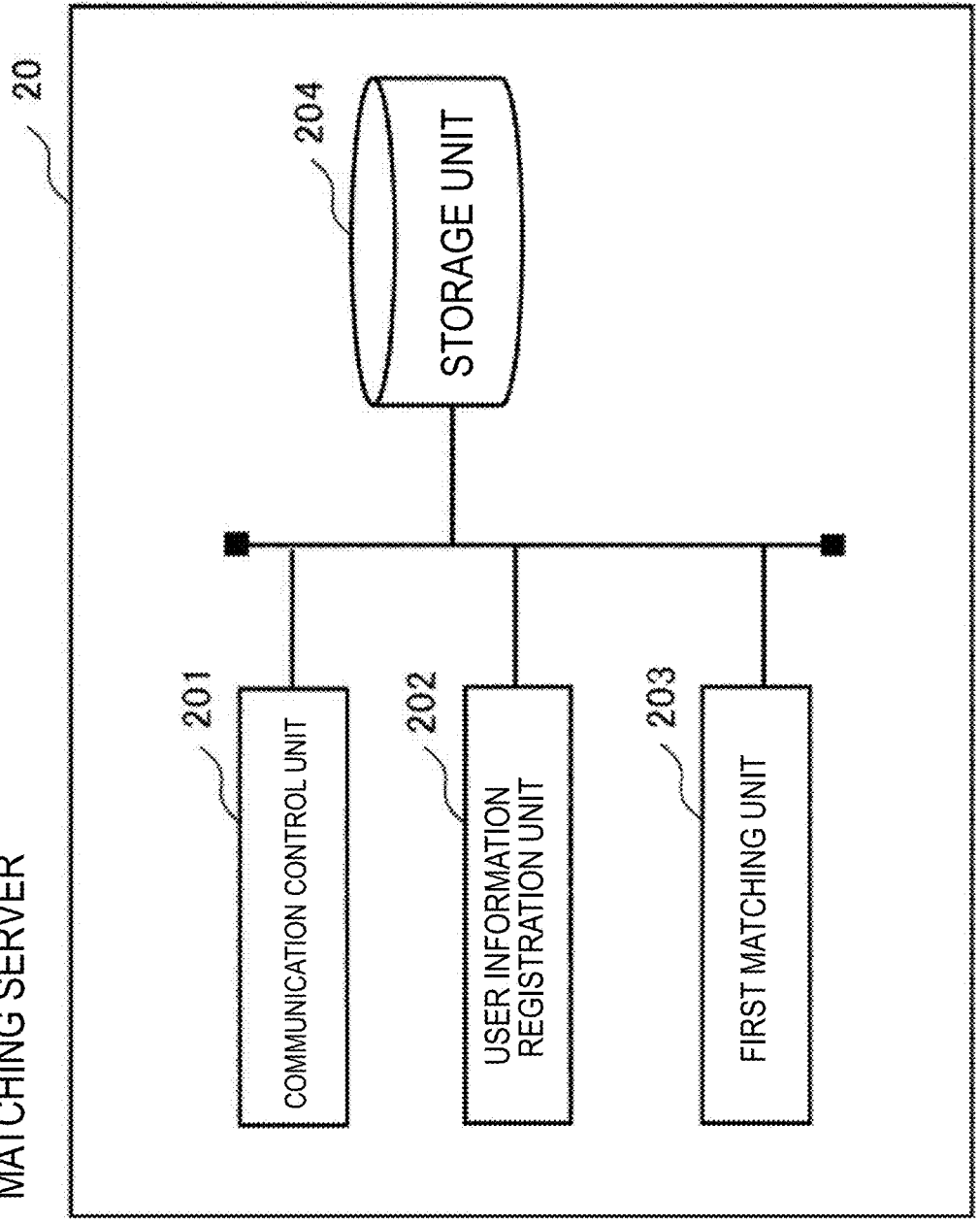
FIG. 3 is a diagram illustrating an example of a processing configuration of a matching server according to the first example embodiment.

FIG. 3 is a diagram for illustrating an example of a processing configuration (processing modules) of the matching server 20 according to the first example embodiment. As illustrated in FIG. 3, the matching server 20 includes a communication control unit 201, a user information registration unit 202, a first matching unit 203, and a storage unit 204.

The communication control unit 201 is means for controlling communication with other apparatuses. Specifically, the communication control unit 201 receives data (packets) from the gate apparatuses 10. In addition, the communication control unit 201 transmits data to the gate apparatuses 10.

The user information registration unit 202 is means for acquiring gate user information and registering the acquired gate user information in the gate user database established in the storage unit 204. The user information registration unit 202 can use any method to acquire the gate user information.

For example, an officer in charge at a passport center may register gate user information in the matching server 20. Specifically, an officer in charge operates a scanner and reads out a photograph of a face and a page including an MRZ in a passport. The officer in charge operates a terminal (a computer installed at the passport center) and transmits the read data (image data) to the matching server 20. Alternatively, the above data may be input to the matching server 20 via an external storage device, such as a USB (Universal Serial Bus) memory.

The above data (image data including the photograph of the face and the MRZ) may be input to the matching server 20 during a check-in procedure at the airport. Specifically, when an airline company staff member checks the passport of the user, the staff member reads out the photograph of the face and the page including the MRZ by using a scanner. The airline company staff member may transmit the read data from a terminal to the matching server 20.

Alternatively, the user may use a so-called automatic check-in machine, to read the photograph of the face and the page including the MRZ by himself or herself. In this case, the data read from the automatic check-in machine is transmitted to the matching server 20.

The user may capture the photograph of the face and the page including the MRZ in the passport, to acquire image data including the photograph of the face and the MRZ. Specifically, the user uses a smartphone or the like to capture the photograph of the face and the page including the MRZ in the passport. Next, the captured image data is transmitted from the smartphone or the like to the matching server 20.

Alternatively, the image data including the photograph of the face and the MRZ may be acquired from a database in which records of the users who have been abroad are stored. Specifically, if the photograph of the face and the MRZ have previously been acquired at a manned emigration and immigration booth and registered in a database, the corresponding image data may be transmitted from the database to the matching server 20.

The user information registration unit 202 may use any one of the above-described methods or a different method, to acquire the image data including the photograph of the face and the MRZ included in the passport of the user.

The user information registration unit 202 extracts feature points from the face image included in the acquired image data. Since an existing technique can be used to extract these feature points, detailed description of the extraction will be omitted. For example, the user information registration unit 202 extracts the eyes, nose, mouth, etc. as feature points from the face image. Next, the user information registration unit 202 calculates, as feature values, the location of the individual feature point and the distance between feature points and generates a feature vector formed by a plurality of feature values (vector information that features the face image).

The user information registration unit 202 extracts the MRZ information from the image data including the MRZ information. Specifically, the user information registration unit 202 uses an optical character recognition (OCR) technique to extract the MRZ information from the image data.

The user information registration unit 202 associates the generated feature vector and the extracted MRZ information with each other and registers the associated information in the gate user database.

FIG. 4 is a diagram illustrating an example of the gate user database. As illustrated in FIG. 4, the feature vectors generated from face images are registered as biological information. In addition, MRZ information corresponding to the individual biological information (feature vectors) is registered in the gate user database.

The first matching unit 203 is means for processing matching requests transmitted by the gate apparatuses 10. Specifically, the first matching unit 203 sets the biological information (the feature vector) included in a matching request as the matching target and performs matching processing between this biological information and the biological information registered in the gate user database.

More specifically, the first matching unit 203 sets a feature vector extracted from a matching request as the matching target and performs 1-to-N matching (N will hereinafter represent a positive integer) between this feature vector and the plurality of feature vectors registered in the gate user database.

The first matching unit 203 calculates a similarity between the feature vector as the matching target and each of the plurality of feature vectors registered. For this similarity, the chi-squared distance, the Euclidean distance, or the like may be used. A large distance represents a lower similarity, and a smaller distance represents a higher similarity.

The first matching unit 203 searches the plurality of feature vectors registered in the gate user database for a feature vector whose similarity to the matching target feature vector is more than or equal to a predetermined value and whose similarity is the highest.

The first matching unit 203 reads out the MRZ information corresponding to the feature vector (biological information) obtained as a result of the 1-to-N matching from the gate user database. The first matching unit 203 transmits the read MRZ information to the gate apparatus 10 that has transmitted the matching request (replies to the matching request).

For example, in the example in FIG. 4, if the similarity between a feature vector FV acquired from a gate apparatus 10 and a feature vector FV1 stored in the gate user database is the highest and if the similarity is more than or equal to a predetermined value, MRZ01 corresponding to this feature vector FV1 is transmitted to the gate apparatus 10.

If, as a result of the above 1-to-N matching, the biological information that matches (substantially matches or is substantially similar to) the biological information included in the matching request is not registered in the gate user database, the first matching unit 203 notifies the gate apparatus 10 to that effect. For example, the first matching unit 203 sets "None" and transmits a reply to the gate apparatus 10.

Alternatively, the first matching unit 203 may notify the gate apparatus 10 that the biological information included in the matching request is not included in the gate user database by not transmitting any reply to the gate apparatus 10. In this case, the gate apparatus 10 that has transmitted the matching request recognizes that the biological information included in the matching request is not included in the gate user database by not receiving any reply from the matching server 20 within a predetermined period.

The storage unit 204 stores various kinds of information necessary for operations of the matching server 20. In addition, as described above, the gate user database is established in the storage unit 204.

Figure 5:
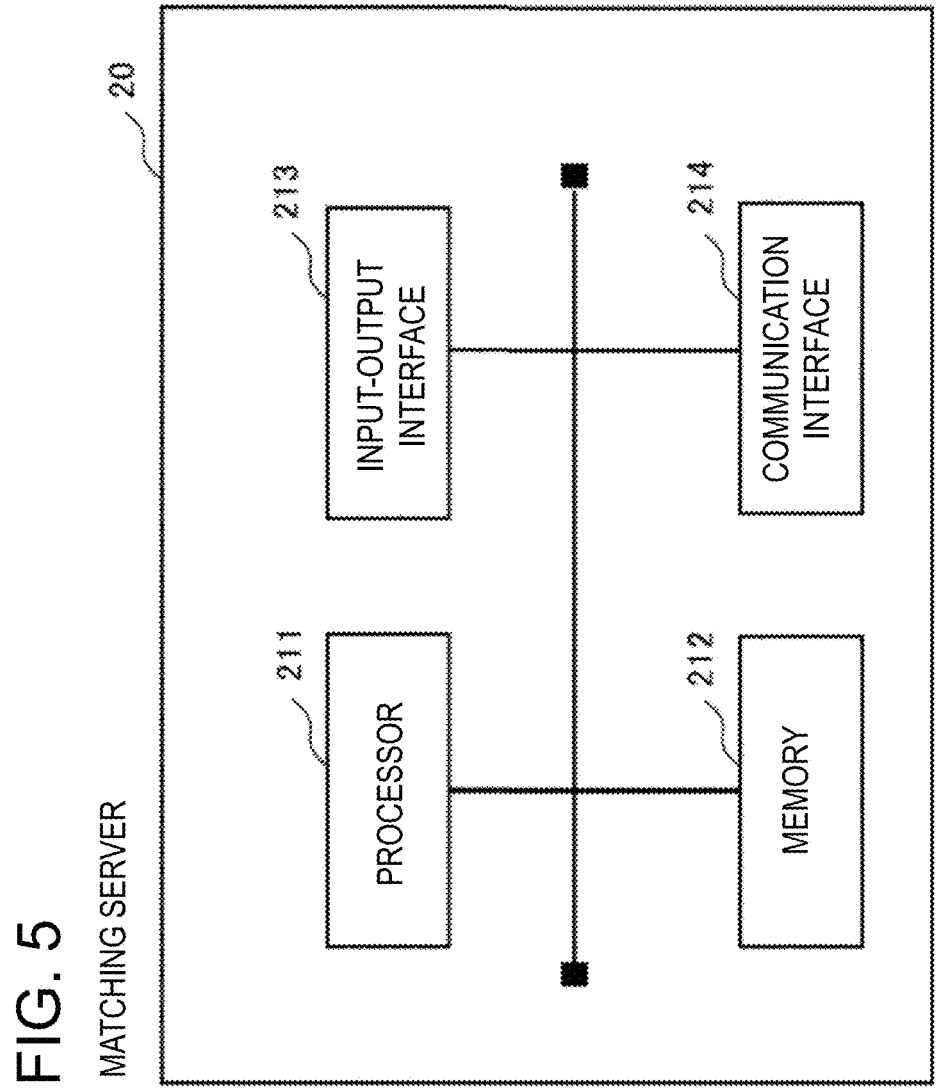
FIG. 5 is a diagram illustrating an example of a hardware configuration of the matching server according to the first example embodiment.

FIG. 5 is a diagram illustrating an example of a hardware configuration of the matching server 20 according to the first example embodiment. The matching server 20 can be configured by an information processing apparatus (a so-called computer) and has a configuration illustrated as an example in FIG. 5. For example, the matching server 20 includes a processor 211, a memory 212, an input-output interface 213, a communication interface 214, etc. The components such as the processor 211 are connected to an internal bus, etc. so that these components can communicate with each other.

The hardware configuration of the matching server 20 is not limited to the configuration illustrated in FIG. 5. The matching server 20 may include hardware not illustrated or may be configured without the input-output interface 213 if desired. In addition, the number of components, such as the number of processors 211, included in the matching server 20 is not limited to the example illustrated in FIG. 5. For example, a plurality of processors 211 may be included in the matching server 20.

For example, the processor 211 is a programmable device such as a CPU (Central Processing Unit), an MPU (Micro Processing Unit), or a DSP (Digital Signal Processor). Alternatively, the processor 211 may be a device such as an FPGA (Field Programmable Gate Array) or an ASIC (Application Specific Integrated Circuit). The processor 211 executes various kinds of programs including an operating system (OS).

The memory 212 is a RAM (Random Access Memory), a ROM (Read-Only Memory), an HDD (Hard Disk Drive), an SSD (Solid State Drive), or the like. The memory 212 stores an OS program, an application program, and various kinds of data.

The input-output interface 213 is an interface for a display apparatus and an input apparatus not illustrated. For example, the display apparatus is a liquid crystal display or the like. For example, the input apparatus is an apparatus, such as a keyboard or a mouse, which receives user operations.

The communication interface 214 is a circuit, a module, or the like for performing communication with other apparatuses. For example, the communication interface 214 includes a NIC (Network Interface Card) or the like.

The function of the matching server 20 is realized by various kinds of processing modules. The processing modules are realized, for example, by causing the processor 211 to execute a program stored in the memory 212. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

[Management Server]

Next, the management server 30 according to the first example embodiment will be described. The management server 30 is an apparatus that calculates a ratio of users of the first nationality (for example, Japanese nationality) to all users undergoing the emigration and immigration examination. The management server 30 determines the operating mode of the gate apparatus 10 based on the calculated user ratio. The hardware configuration of the management server 30 can be identical to that of the matching server 20, so that description is omitted.

Figure 6:
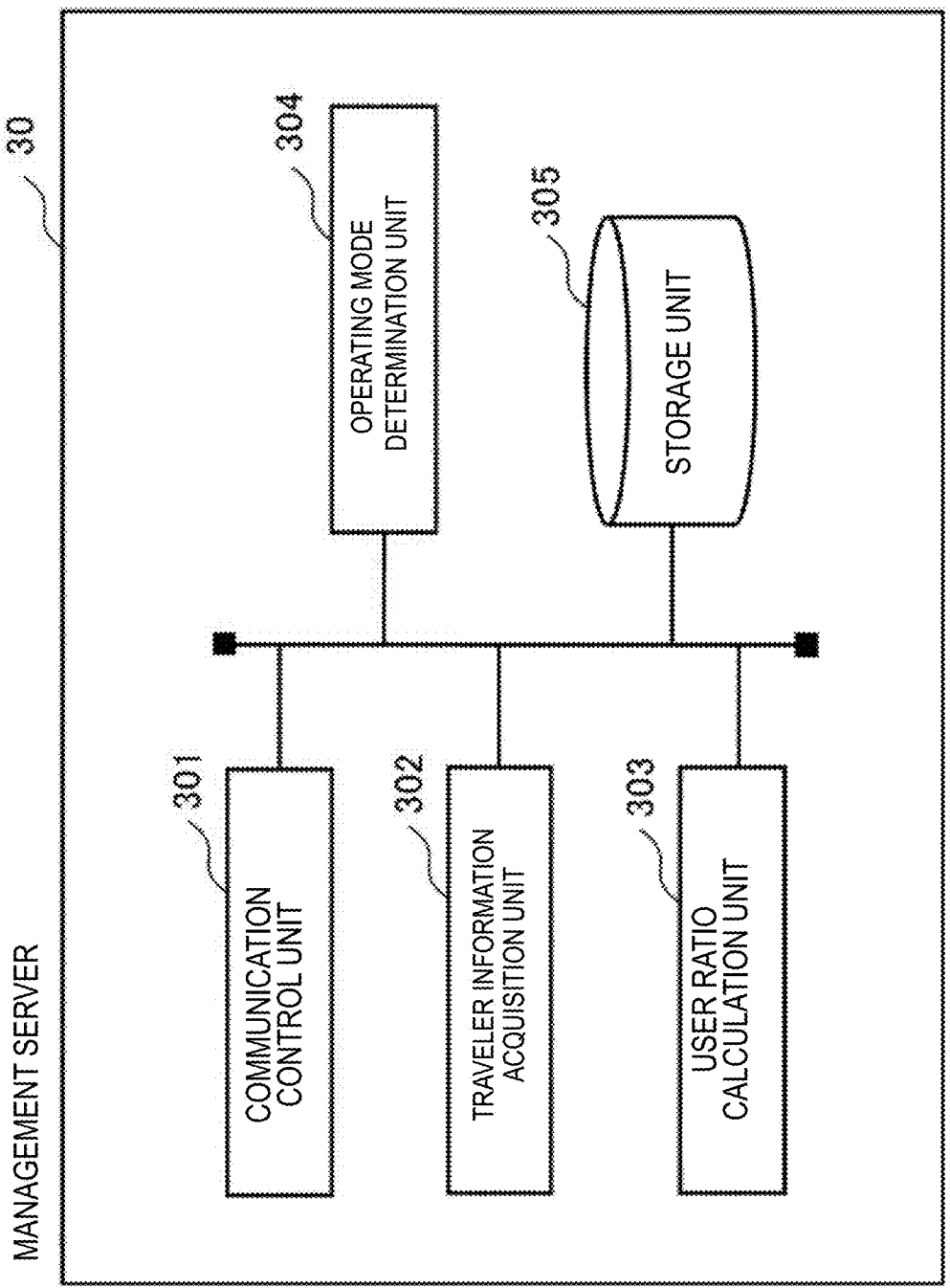
FIG. 6 is a diagram illustrating an example of a processing configuration of a management server according to the first example embodiment.

FIG. 6 is a diagram illustrating an example of a processing configuration (processing modules) of the management server 30 according to the first example embodiment. As illustrated in FIG. 6, the management server 30 includes a communication control unit 301, a traveler information acquisition unit 302, a user ratio calculation unit 303, an operating mode determination unit 304, and a storage unit 305.

The communication control unit 301 is means for controlling communication with other apparatus. Specifically, the communication control unit 301 receives data (packets) from airline servers, etc., as described below. In addition, the communication control unit 301 transmits data to the gate apparatuses 10.

The traveler information acquisition unit 302 is means for acquiring traveler information from an airline server (not shown) managed and operated by an airline that operates an aircraft arriving in Japan from a foreign country. The airline server may be a server managed and operated by a company or organization different from the airline that operates the aircraft used by travelers from a foreign country to Japan.

The traveler information includes information on travelers from abroad to Japan. The traveler information includes the traveler's passport information, flight information, etc.

The passport information includes the country of issue, passport number, name, nationality, date of birth, gender, etc.

The flight information includes airline name, flight number, place of departure, place of arrival, date and time of departure, date and time of arrival, etc. The place of departure and the place of arrival can mean the airport of departure and arrival, respectively.

Airlines in each country obtain the above passport information and flight information when a user (a traveler to Japan) makes a reservation for an airplane or goes through boarding procedures (check-in procedures, etc.). These pieces of information are correlated to form the traveler information.

The airline server transmits the above traveler information to the management server 30 at predetermined times, during predetermined periods, etc. For example, the airline server sends the above traveler information to the management server 30 after the traveler completes the check-in procedures and before the aircraft departs. Alternatively, the airline server transmits the above traveler information to the management server 30 when the aircraft carrying the traveler takes off from the departure airport or when the aircraft lands at the arrival airport.

Further detailed explanation of the airline server is omitted because the airline server can be realized if an existing server normally installed and managed by an airline company sends the collected flight information, etc. to the management server 30 of the present application.

The traveler information acquisition unit 302 adds the acquired traveler information to the traveler database. The traveler database is a database that stores a plurality of traveler information (see FIG. 7).

The user ratio calculation unit 303 is means for calculating the user rate of a particular nationality (user ratio) as explained above. The user ratio calculation unit 303 calculates the user ratio periodically or at predetermined events, etc. For example, the user ratio calculation unit 303 calculates the user ratio (for example, Japanese ratio) for each hour. Alternatively, the user ratio calculation unit 303 calculates the user ratio according to an instruction from the system administrator.

The user ratio calculation unit 303 accesses the traveler database and acquires the nationality of each aircraft passenger who arrived during a predetermined time prior to the time of the user ratio calculation. The user ratio calculation unit 303 calculates the number of Japanese in the above period based on the acquired nationality.

The user ratio calculation unit 303 calculates the user ratio (Japanese ratio) by dividing the number of Japanese by the total number of users (the sum of the number of Japanese and the number of foreigners during the above period) (see Formula (1)).

[Formula 1]

$$\text{User Ratio (Japanese Ratio)} = \text{Total number of Japanese}/\text{Total number of users} \quad (1)$$

The user ratio calculation unit 303 gives the calculated user ratio to the operating mode determination unit 304.

The operating mode determination unit 304 is means for determining the operating mode of the gate apparatus 10 based on the user ratio. Specifically, the operating mode determination unit 304 determines the operating mode for at least one or more gate apparatus 10 among the plurality of gate apparatus 10. For example, the operating mode determination unit 304 determines the operating mode of each gate apparatus so that if the user ratio (Japanese ratio) is high, the number of the gate apparatuses 10 performs the Japanese immigration examination will increase. In contrast, the operating mode determination unit 304 determines the operating mode of each gate apparatus 10 so that if the Japanese ratio is low, the number of gate apparatus 10 performing foreigner immigration examination will increase.

For example, the operating mode determination unit 304 determines the operating mode of the gate apparatus 10 by referring to table information that maps the user ratio to the number of gate apparatus 10 to be operated in the Japanese examination mode. For example, the operating mode determination unit 304 refers to the table information shown in FIG. 8 to determine the number of the gate apparatus 10 that operate in the Japanese examination mode.

Once the operating mode determination unit 304 determines the number of gate apparatus 10 operating in the Japanese examination mode, and determines the gate apparatus 10 whose operating mode is to be changed. Specifically, when increasing the number of gate apparatus 10 operating in Japanese examination mode, the operating mode determination unit 304 selects the number of apparatuses for the increase (change) out of the gate apparatuses 10 operating in foreigner examination mode. The operating mode determination unit 304 provides instructions to change the operating mode for the selected gate apparatuses 10. In the above example, the operating mode determination unit 304 sends the setting switchover notification to the selected gate apparatus 10 to operate in the Japanese examination mode.

The storage unit 305 stores a gate apparatus management table that maps identifiers of the gate apparatuses 10 to the operating mode of each gate apparatuses 10. The operating mode determination unit 304 updates the gate apparatus management table when the setting switchover notification is sent.

The storage unit 305 stores various kinds of information necessary for the operation of the management server 30. In addition, as described above, the traveler database is established in the storage unit 305.

[Gate Apparatus]

Next, the gate apparatus 10 according to the first example embodiment will be described.

Figure 9:
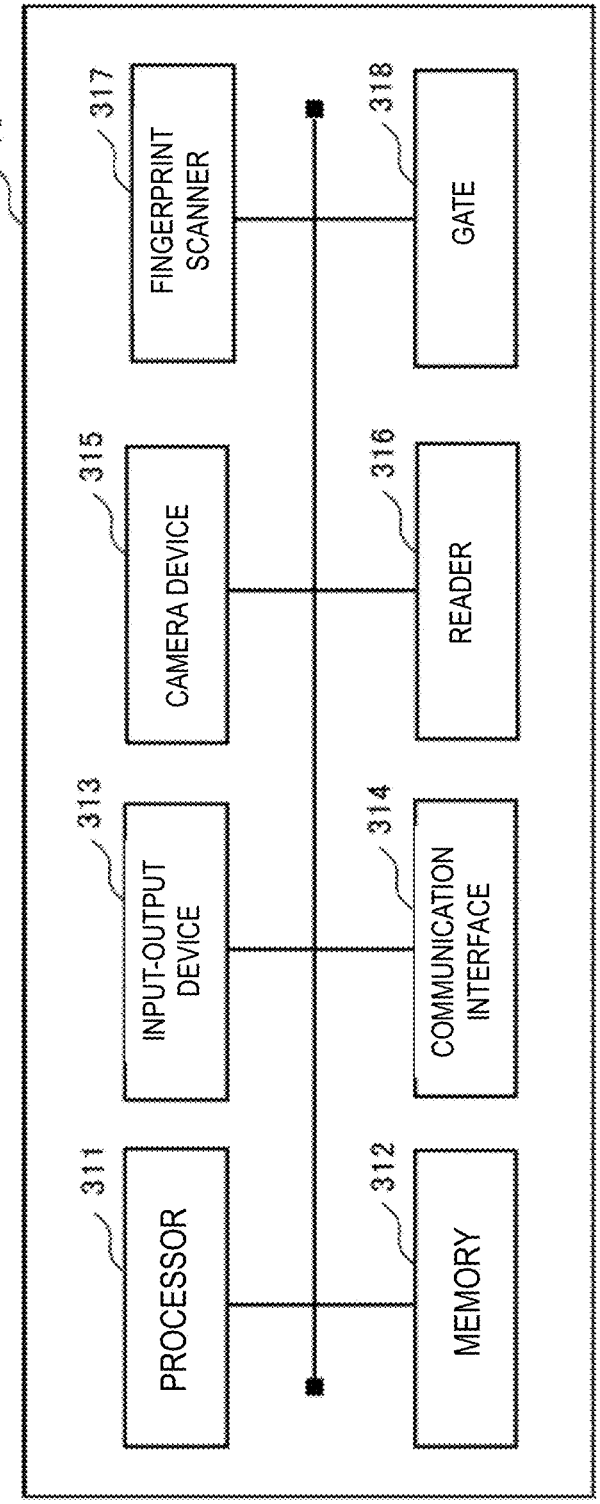
FIG. 9 is a diagram illustrating an example of a hardware configuration of the gate apparatus according to the first example embodiment.

FIG. 9 is a diagram illustrating an example of a hardware configuration of the gate apparatus 10 according to the first example embodiment. As illustrated in FIG. 9, the gate apparatus 10 includes a processor 311, a memory 312, an input-output device 313, a communication interface 314, a camera device 315, a reader 316, a fingerprint scanner 317, and a gate 318.

Since the processor 311, the memory 312, and the communication interface 314 may be equivalent to those of the matching server 20 described with reference to FIG. 5, detailed description thereof will be omitted.

The input-output device 313 serves as a device (for example, a touch panel) for inputting information to the gate apparatus 10 and a device (for example, a liquid crystal monitor and other displays) for outputting information.

For example, the camera device 315 is a digital camera installed to capture an image in front of the gate apparatus 10. The camera device 315 may be installed at any location. For example, the camera device 315 may be installed on the main body of the gate apparatus 10 or away from the gate apparatus 10. As long as the camera device 315 can capture an image of a user approaching the gate apparatus 10 (in particular, the face of the user), the camera device 315 may be installed at any location.

The reader 316 is a device that reads out information from passports. The reader 316 has a function of accessing IC chips in passports and a function of scanning pages of passports placed. That is, the reader 316 has a function as a card reader that exchanges information (data) with IC chips in passports in a non-contact state and has a function as a passport reader (a scanner) that acquires images from passports. The reader 316 may be installed at any location. However, it is preferable that the reader 316 be installed at a location where users can easily bring their passports into contact with this reader 316. While the present application will be described assuming that the reader 316 has a function as a card reader and a function as a passport reader, these two functions may be of course realized by different devices.

The fingerprint scanner 317 is a device for acquiring a person's fingerprints. The fingerprint scanner 317 can take fingerprints from up to 10 fingers.

When a user passes the immigration examination, the gate 318 shifts from a closed state in which the gate 318 blocks passage of the user to an opened state in which passage of the user is permitted. The mechanism of the gate 318 is not limited to any particular mechanism. For example, the gate 318 is a flap gate that opens and closes a flap installed on one side or flaps installed on both sides of the passage or is a turnstile gate that rotate three bars.

Figure 10:
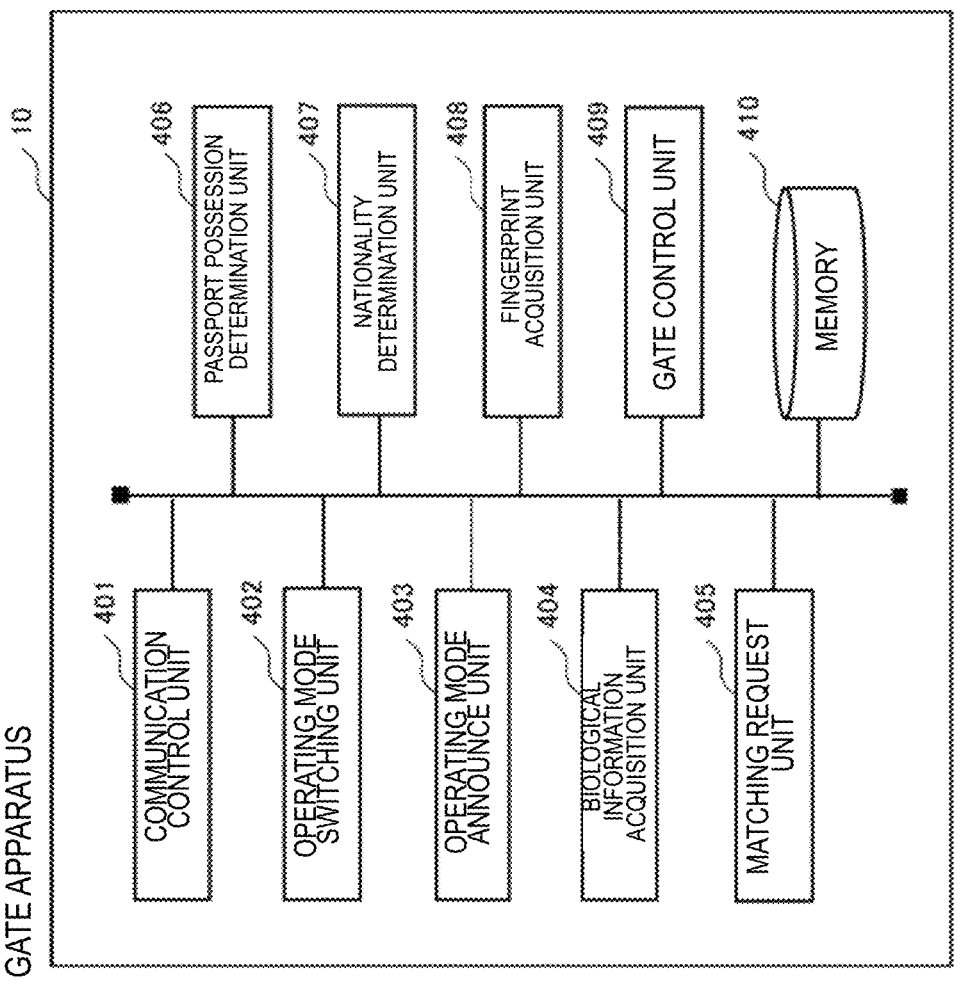
FIG. 10 is a diagram illustrating an example of a processing configuration of the gate apparatus according to the first example embodiment.

FIG. 10 is a diagram illustrating an example of a processing configuration (processing modules) of the gate apparatus 10 according to the first example embodiment. As illustrated in FIG. 10, the gate apparatus 10 includes a communication control unit 401, an operating mode switching unit 402, an operating mode announce unit 403, and a biological information acquisition unit 404. The gate apparatus 10 further includes a matching request unit 405, a passport possession determination unit 406, a nationality determination unit 407, a fingerprint acquisition unit 408, a gate control unit 409, and a storage unit 410.

As with the communication control unit 201 of the matching server 20, the communication control unit 401 is means for controlling communication with other apparatuses.

The operating mode switching unit 402 is means for switching the operation mode for emigration and immigration examination of the examination target user to the operation mode determined by the management server 30. Specifically, the operating mode switching unit 402 switches the operating mode of the apparatus according to the "setting switchover notification" received from the management server 30. The operating mode switching unit 402 sets the acquired operating mode to the parameter that manages the operating mode of the apparatus. The parameter is stored in the storage unit 410.

The operating mode announce unit 403 is means for informing the user (user waiting for examination) of the operating mode of the apparatus. For example, the operating mode announce unit 403 displays a message according to a current operating mode on an LCD monitor or other display.

The biological information acquisition unit 404 is means for acquiring biological information about users who wish to pass through the gate apparatus 10. For example, the biological information acquisition unit 404 controls the camera device 315 and acquires a face image of a person walking toward the camera device 315 (the gate apparatus 10). For example, when the biological information acquisition unit 404 detects a user's face in an image being constantly or regularly captured, the biological information acquisition unit 404 captures the user's face and acquires the image of the face.

If the size of the face area included in the captured image is more than or equal to a predetermined value, the biological information acquisition unit 404 may extract the face area from the image. In this case, by appropriately adjusting the predetermined value (a threshold), the biological information acquisition unit 404 can acquire the face image of the user at a location a predetermined distance away from the gate apparatus 10. That is, it is possible to prevent capturing an image of the user at a location far away from the gate apparatus 10 and prevent transmitting biological information inappropriate for face authentication (1-to-1 matching by the matching server 20) to the matching server 20.

Alternatively, the biological information acquisition unit 404 may measure the distance between the gate apparatus 10 and a user by using a distance sensor or the like and may acquire a face image of a user at a predetermined location.

The biological information acquisition unit 404 gives the acquired face image to the matching request unit 405.

The matching request unit 405 is means for requesting the matching server 20 to perform matching to determine whether the biological information about the person corresponding to the acquired face image is registered in the gate user database. Specifically, the matching request unit 405 calculates feature values from the acquired face image and generates a feature vector from the plurality of feature values (generates a feature vector corresponding to the biological information registered in the matching server 20).

The matching request unit 405 generates a matching request including the generated feature vector (biological information) and transmits the generated matching request to the matching server 20 via the communication control unit 301.

Figure 11:
FIG. 11 is a diagram illustrating an example of a matching request.

For example, the matching request unit 405 generates a matching request including an identifier of the corresponding gate apparatus 10 (hereinafter referred to as a gate identifier), a feature vector, etc. (see FIG. 11). A MAC (Media Access Control) address or an IP (Internet Protocol) address of the gate apparatus 10 may be used as the gate identifier.

The matching request unit 405 receives a reply to the matching request from the matching server 20 via the communication control unit 301. The matching request unit 405 gives the reply (MRZ information corresponding to the feature vector determined by the 1-to-N matching) from the matching server 20 to the passport possession determination unit 406 and the nationality determination unit 407.

The passport possession determination unit 406 is means for determining whether the user who wishes to pass through the gate apparatus 10 possesses a correct passport. Specifically, the passport possession determination unit 406 attempts to read out information from an IC chip in the passport held over the reader 316 by using the MRZ information acquired from the matching request unit 405.

As described in "Measures for Safety of IC Passports" in the following reference document 1, information stored in an IC chip in a passport is encrypted (converted) by using MRZ information written in the same passport as a password.
<Reference Document 1>
https://www.mofa.go.jp/mofaj/toko/passport/ic_faq.html#11

If the passport possession determination unit 406 succeeds in reading out information from the IC chip by using the MRZ information acquired from the matching server 20 (succeeds in decrypting the information), the passport possession determination unit 406 determines that the user who wishes to pass through the gate apparatus 10 possesses a correct passport.

In contrast, if the passport possession determination unit 406 fails to read out information from the IC chip by using the acquired MRZ information from the matching server 20, the passport possession determination unit 406 determines that the user who wishes to pass through the gate apparatus 10 does not possess a correct passport.

In this way, if the passport possession determination unit 406 succeeds in reading out information from the IC chip by using the MRZ information (succeeds in decrypting the encrypted information), the passport possession determination unit 406 determines that the user possesses a correct passport. Thus, the passport possession determination unit 406 may check or may not check the content of the information read out from the IC chip.

If the passport possession determination unit 406 determines that the user who wishes to pass through the gate apparatus 10 possesses a correct passport, the passport possession determination unit 406 notifies the gate control unit 409 to that effect.

If the passport possession determination unit 406 determines that the user who wishes to pass through the gate apparatus 10 does not possess a correct passport, the passport possession determination unit 406 does not perform any particular operation. That is, if the passport possession determination unit 406 determines that the user who wishes to pass through the gate apparatus 10 does not possess a correct passport, the gate 318 does not open the gate.

The nationality determination unit 407 is means for determining the nationality of the users who wish to pass through the gate apparatus 10. Specifically, the nationality determination unit 407 determines whether the user's nationality is Japanese or foreign based on the MRZ information obtained from the matching request unit 405. The nationality determination unit 407 notifies the determination result (Japanese or foreign) to the fingerprint acquisition unit 408 and the gate control unit 409.

The fingerprint acquisition unit 408 is means for acquiring the user's fingerprint using the fingerprint scanner 317. The fingerprint acquisition unit 408 does not perform any special operation when the operating mode is "Japanese examination mode".

In contrast, the fingerprint acquisition unit 408 acquires the user's fingerprint when the operating mode is "foreigner examination mode". For example, the fingerprint acquisition unit 408 instructs the user to perform an action to obtain a fingerprint. For example, the fingerprint acquisition unit 408 displays a message on an LCD monitor or the like with the contents shown in FIG. 12. The fingerprint acquisition unit 408 controls the fingerprint scanner 317 to obtain fingerprint images. The fingerprint acquisition unit 408 checks a quality (image quality) of the obtained fingerprint image and sets the status to "fingerprint obtaining success" if it meets the specified criteria. In contrast, the fingerprint acquisition unit 408 sets the status to "fingerprint obtaining failure" if the acquired fingerprint image does not meet the specified criteria.

The above specified criteria can be, for example, a size of an area (effective area) in which ridges of the fingerprint are clearly visible. Alternatively, the acquired fingerprint image and the predetermined template image may be compared, and a degree of coincidence (similarity) may be set as the predetermined criteria above. Alternatively, a learning model obtained by machine learning may be used to determine fingerprint quality. For example, a number of fingerprint images that are judged by a fingerprint forensic scientist to meet the criteria can be collected, and the fingerprint images can be labeled to generate a learning model by using them as teacher data. Any algorithm such as support vector machines, boosting, or neural networks can be used to generate the learning model. Since known techniques can be used for the above support vector machine and other algorithms, their description is omitted. The fingerprint acquisition unit 408 may input the obtained fingerprint image into the learning model and determine the quality of the fingerprint image according to its similarity to the labeled fingerprint image.

In the event of the fingerprint obtaining failure, the fingerprint acquisition unit 408 notifies the user that the fingerprint will be reacquired and reacquires the fingerprint.

If the fingerprint acquisition unit 408 is able to acquire a fingerprint that meets the specified criteria (when the status is fingerprint obtaining success), the fingerprint acquisition unit 408 notifies the gate control unit 409 to that effect.

The gate control unit 409 is means for controlling the gate 318 of the gate apparatus 10. Once the examination target user passes the emigration and immigration examination, the gate control unit 409 controls the gate 318 so that the examination target user can pass through the gate 318. More specifically, the gate control unit 409 controls the opening and closing of the gate based on the operating mode of the apparatus, the nationality of the user determined by the nationality determination unit 407, the passport possession judgment result and fingerprint obtaining result.

If the operating mode is "Japanese examination mode," the nationality of the examination target user is "Japanese," and the passport possession judgment result is "correct passport possession," the gate control unit 409 opens the gate 318.

If the operating mode is "Japanese examination mode" and the nationality of the examination target user is "foreign", the gate control unit 409 keeps the gate 318 closed. Since the fingerprints required for examination of foreign nationals have not been taken, the gate apparatus 10 cannot allow the examination target user to pass through the gate 318. In this case, the gate apparatus 10 may display a message encouraging the user to move to the gate apparatus 10 that can examine the examination of foreigner or to a staffed examination booth.

If the operating mode is "foreigner examination mode," the nationality of the examination target user is "foreign," the passport possession judgment result is "correct passport possession," and the fingerprints has been successfully obtained, the gate control unit 409 opens the gate 318.

If the operating mode is "foreigner examination mode" and the nationality of the examination target user is "Japanese," it is desirable for the gate control unit 409 to keep the gate 318 closed. In this case, the gate apparatus 10 can successfully complete the examination, but essentially, Japanese cannot be examined by the gate apparatus 10 in the foreigner examination mode. Therefore, when the gate apparatus 10 opens the gate 318 and allows the examination target users (Japanese users) to pass through the gate 318, other users become dissatisfied and other problems arise. Therefore, the gate apparatus 10 may display a message encouraging the user to move to the gate apparatus 10 that can examine the examination of Japanese or to the staffed examination booths. If the operating mode is "foreigner examination mode" and the nationality of the examination target user is "Japanese," the gate control unit 409 may open the gate 318, of course.

The operation of the above gate control unit 409 is summarized in FIG. 13.

After a user (a user passing the immigration examination) who is permitted to pass through the gate 318 has passed through the gate 318, the gate control unit 409 closes the gate 318.

[Operation in Immigration Examination System]

Next, an operation in the immigration examination system according to the first example embodiment will be described.

Figure 14:
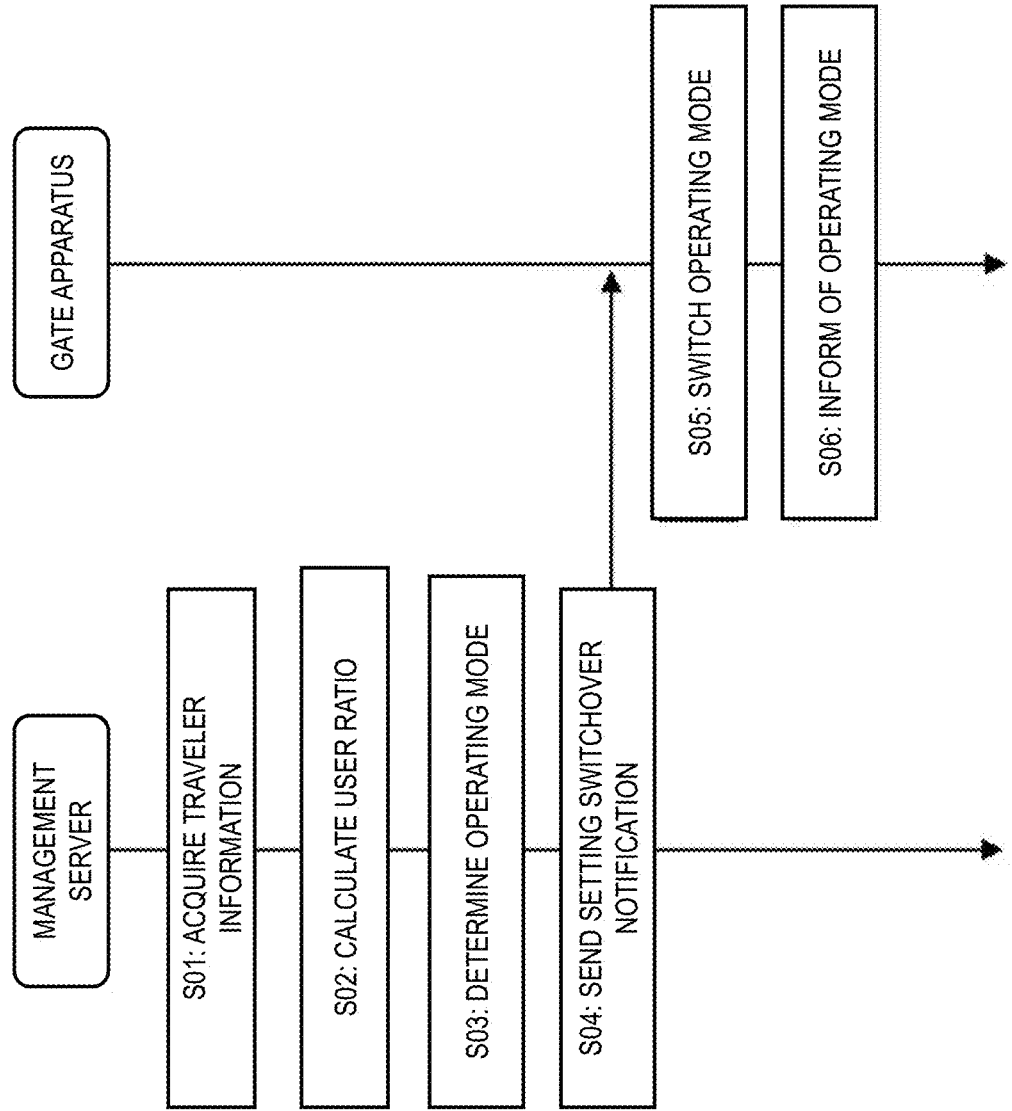
FIG. 14 is a sequence diagram illustrating an example of an operation in an immigration system according to the first example embodiment.

FIG. 14 is a sequence diagram illustrating an example of an operation in an immigration system according to the first example embodiment. Referring to FIG. 14, the operation of the management server 30 is described mainly.

The management server 30 acquires "traveler information" from the airline server (step S01).

The management server 30 calculates the user ratio periodically or at a predetermined timing (step S02).

The management server 30 determines the operating mode of the gate apparatus 10 based on the calculated user ratio (step S03). For example, a first operating mode for immigration examination of users of a first nationality (Japanese) and a second operating mode for immigration examination of users of a second nationality (foreigner) can be set for the gate apparatus 10. The management server 30 selects the gate apparatus 10 to change the operating mode out of the plurality of gate apparatuses 10.

The management server 30 sends the "setting switchover notification" to the gate apparatus 10 that switches operating modes (step S04).

The gate apparatus 10 switches its operating mode according to the acquired setting switchover notification (step S05).

The gate apparatus 10 informs the users waiting for examination of the operating mode after the switchover (step S06).

Figure 15:
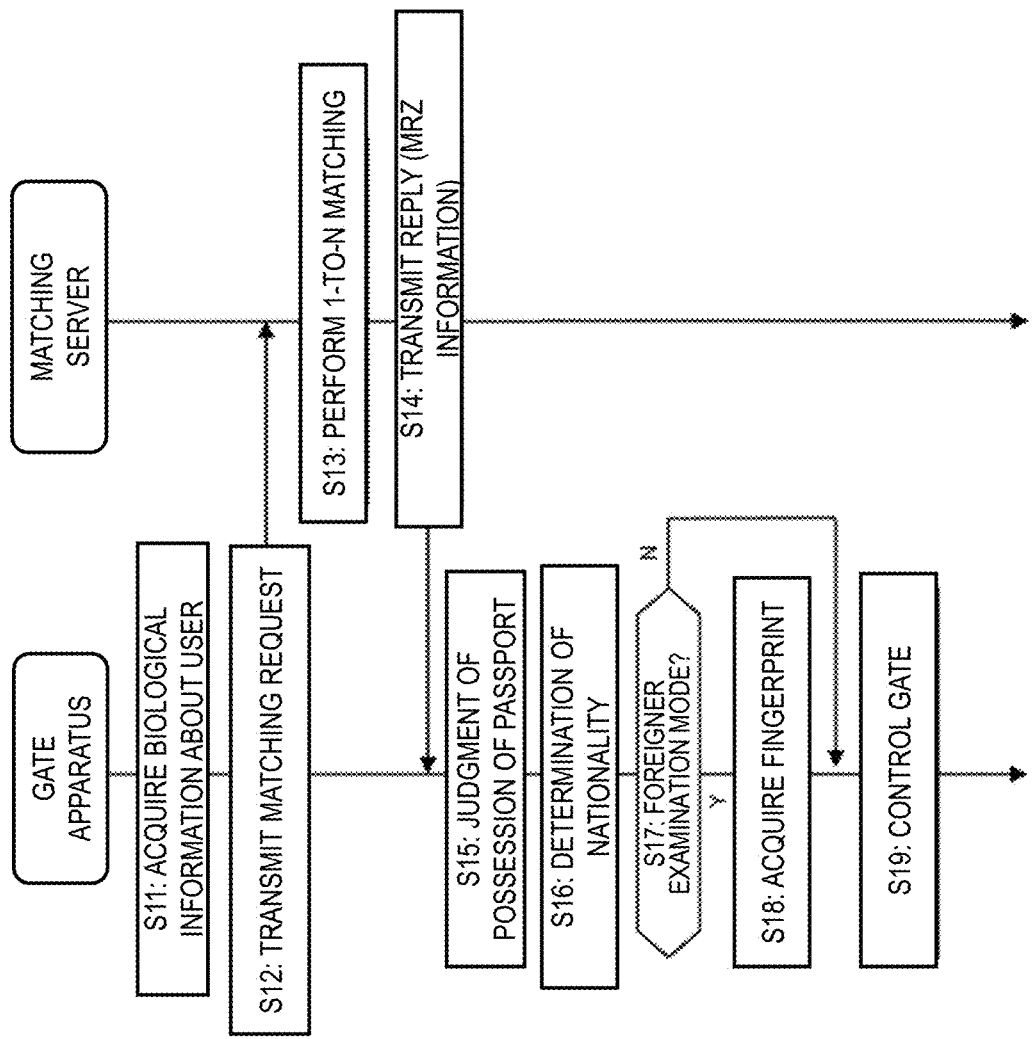
FIG. 15 is a sequence diagram illustrating an example of an operation in an immigration system according to the first example embodiment.

FIG. 15 is a sequence diagram illustrating an example of an operation in the immigration system according to the first example embodiment. Referring to FIG. 15, the operation of the gate apparatus 10 is described mainly. The following description assumes that, prior to this operation in FIG. 15, the "gate user information" about the user is previously registered in the matching server 20.

When a user approaches the gate apparatus 10, the gate apparatus 10 acquires biological information from the user (step S11). For example, the gate apparatus 10 acquires a face image of the user.

When the gate apparatus 10 successfully acquires a face image, the gate apparatus 10 transmits a matching request including the biological information about the user to the matching server 20 (step S12). Specifically, the gate apparatus 10 calculates a feature vector from the face image and transmits a matching request including the calculated feature vector to the matching server 20.

Upon acquiring the matching request, the matching server 20 extracts the biological information (the feature vector) from the matching request and performs 1-to-N matching between the feature vector and the biological information registered in the gate user database (step S13). The matching server 20 searches the plurality of items of biological information registered in the gate user database for biological information whose similarity to the biological information acquired from the gate apparatus 10 is the highest and whose similarity is more than or equal to a predetermined value.

The matching server 20 transmits a reply including the MRZ information determined as a result of the above 1-to-N matching to the gate apparatus 10 (the gate apparatus 10 that has transmitted the matching request) (step S14).

The gate apparatus 10 determines whether the user possesses a correct passport (step S15). Specifically, the gate apparatus 10 reads out information from an IC chip in the passport held over the reader 316 by using the received MRZ information, and determines that the user is in possession of the correct passport if the information is read out. The gate apparatus 10 determines that the user does not possess the correct passport if the information is not read out from the IC chip in the passport.

The gate apparatus 10 determines the nationality of the user based on the MRZ information acquired from the matching server 20 (step S16).

If the operating mode is the "foreigner examination mode" (step S17, Yes), the gate apparatus 10 acquires the user's fingerprints (step S18). The gate apparatus 10 does not perform any operation of the fingerprint acquisition if the operating mode is "Japanese examination mode".

After that, the gate apparatus 10 controls the opening and closing of gate 318 (step S19). Specifically, if the user is Japanese, the gate apparatus 10 opens the gate 318 if it is confirmed that the user has the correct passport. In contrast, if the user is a foreigner, the gate apparatus 10 opens the gate 318, in addition to the fact that the user has the correct passport, if the fingerprint image has been successfully obtained.

If the operating mode of the apparatus (Japanese examination mode or foreigner examination mode) does not match the nationality of the examination target user (Japanese or foreigner), the gate apparatus 10 does not open the gate 318. That is, if the nationality of the examination target user obtained when operating in the first operating mode (Japanese examination mode) is the second nationality (other than Japanese; foreign nationality), the examination target user's emigration and immigration will be denied. In this case, the gate apparatus 10 outputs a message or the like such as urging the user to go to the gate apparatus 10 that matches the nationality.

As described above, in the immigration examination system of the first example embodiment, the management server 30 calculates the ratio of Japanese users to all users in a specific period. The management server 30 switches the operating mode (Japanese examination mode or foreigner examination mode) of the gate apparatus 10 based on the calculated ratio. If the management server 30 anticipates an increase in the number of Japanese undergoing immigration examination, the management server 30 increases the number of the gate apparatuses 10 to perform Japanese immigration examinations. If the management server 30 anticipates that the number of foreigners undergoing immigration examination increases, the management server 30 increases the number of the gate apparatuses 10 to perform foreign immigration examinations. The gate apparatus 10, whose operating mode is controlled by the management server 30, operates in such a way that the gate apparatus 10 makes its own operating mode known to the examination target user. Therefore, the examination target users can easily understand the operating mode of each of the gate apparatuses 10 and line up at the gate apparatuses 10 that are appropriate for their nationality.

The throughput of the immigration examination system can be improved by optimally selecting the contents of the table information shown in FIG. 8. As mentioned above, immigration examinations are different for Japanese and foreigners. Therefore, an examination time required per person differs between Japanese and foreigners. Therefore, for example, if the ratio of Japanese is 50%, the number of the gate apparatus 10 operating in Japanese examination mode and the number of the gate apparatus 10 operating in foreigner examination mode is the same, the examination of foreigners will be stalled. Therefore, even if the ratio of Japanese is 50%, the examination time for Japanese and foreigners can be equivalent by increasing the number of the gate apparatus 10 operating in the foreigner examination mode to be larger than the number of the gate apparatus 10 operating in the Japanese operation mode. The number of the gate apparatuses 10 operating in the foreigner operating mode may be determined according to the time required for the immigration examination for each Japanese and foreigner.

Managers and others may also check a status of the examination in real time and change the information shown in FIG. 8. Alternatively, the management server 30 may determine the number of the gate apparatus 10 to change operating mode based on the number of users processed by each of the gate apparatus 10 per unit of time (for example, 10 minutes, 1 hour). Specifically, the gate apparatus 10 obtains from each the gate apparatus the number of processes per unit time, and calculates the number of processes of each the gate apparatus 10 operating in the Japanese examination mode and each the gate apparatus 10 operating in the foreigner examination mode. The management server 30 may determine the operating mode of the gate apparatus 10 so that the two calculated numbers of processes (throughput) are substantially the same. That is, in the first immigration examination system, the throughput of each the gate apparatus 10 is feedback to the management server 30, and the management server 30 may determine the operating mode of the gate apparatuses 10 based on the feedback throughput.

In addition, in the first example embodiment, the biological information of the user who wishes to use the gate apparatus 10 is registered in the matching server 20 in advance. After the registration, when the user appears in front of the gate apparatus 10 on the departure date, the gate apparatus 10 acquires biological information about the user and queries the matching server 20 about whether the acquired biological information is registered in the matching server 20 (requests the matching server 20 to perform 1-to-N matching by using the biological information). As a result of the matching, if the gate apparatus 10 determines that the biological information about the user is registered in the matching server 20, the gate apparatus 10 determines whether the passport presented by the user is truly the passport of the user. Specifically, the gate apparatus 10 determines whether information can be read out from an IC chip in the passport of the user by using the MRZ information determined as a result of the face authentication by the matching server 20. Further, the gate apparatus 10 determines the nationality of the user based on the MRZ information obtained. The gate apparatus 10 completes the immigration examination after obtaining fingerprints from the user if the user is a foreign national in possession of the correct passport. On the other hand, the gate apparatus 10 completes the immigration examination on the condition that the user has been checked to be in possession of the correct passport if the user is Japanese.

Second Example Embodiment

Next, a second example embodiment will be described in detail with reference to drawings.

The first example embodiment assumes that there is no inconsistency (incoherence) between biological information and MRZ information in gate user information registered in the matching server 20. When an officer of a public agency registers gate user information, it is hard to imagine that the above inconsistency occurs. However, when a user registers gate user information in the matching server 20, there is a slight possibility that the above inconsistency occurs.

If the above inconsistency occurs, a correct immigration examination cannot be performed, thereby causing a problem. According to the second example embodiment, a more reliable immigration examination can be realized by causing a gate apparatus 10 to perform matching processing, too.

According to the second example embodiment, the immigration system may have the same schematic configuration and the matching server 20 may have the same processing configuration as those according to the first example embodiment. Thus, description corresponding to FIGS. 2, 3, etc. will be omitted. The following description will be made with a focus on the difference between the first and second example embodiments.

Figure 16:
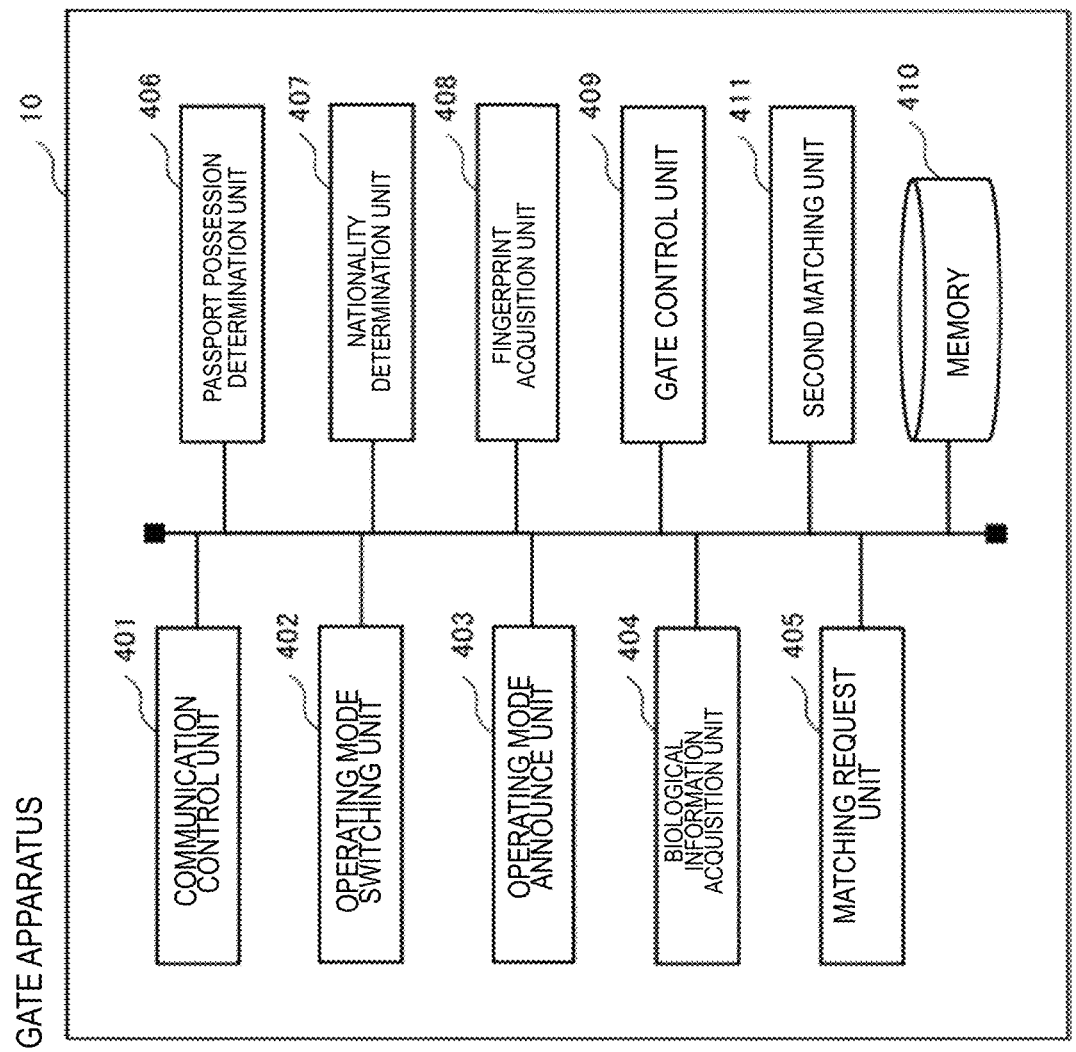
FIG. 16 is a diagram illustrating an example of a processing configuration of a gate apparatus according to a second example embodiment.

FIG. 16 is a diagram illustrating an example of a processing configuration (processing modules) of the gate apparatus 10 according to the second example embodiment. As illustrated in FIG. 16, the gate apparatus 10 includes a second matching unit 411 in addition to the components illustrated in FIG. 10.

The second matching unit 411 is means for performing matching (1-to-1 matching) to determine whether biological information about a user matches biological information read out from an IC chip in a passport that the user has brought into contact with the reader 316.

The biological information acquisition unit 404 stores acquired biological information (for example, a user's face image captured by the camera device 315) in the storage unit 410.

If the passport possession determination unit 406 succeeds in reading out information from an IC chip by using MRZ information acquired from the matching server 20, the passport possession determination unit 406 gives a face image included in the read information to the second matching unit 411.

The second matching unit 411 performs matching (1-to-1 matching) between the face image acquired from the passport possession determination unit 406 and the face image stored in the storage unit 410. Specifically, the second matching unit 411 calculates a feature vector from each of the two images. Next, the second matching unit 411 calculates the similarity (for example, a Euclidean distance) between these two images and determines whether the two images indicate a face image of the same person, based on a result of threshold processing on the calculated similarity. For example, if the similarity is over a predetermined value (if the distance is shorter than a predetermined value), the second matching unit 411 determines that these two face images indicate the same person.

When the second matching unit 411 succeeds in 1-to-1 matching (when a face image of the user in front matches a face image read out from the IC chip of the presented passport), the second matching unit determines that the user has the correct passport.

In the second example embodiment, the nationality determination unit 407 may determine the nationality of the user from the MRZ information or the nationality of the user from the information read out from the IC chip. The IC chip in the passport records the passport holder's name, nationality, and other information.

As described above, if the gate apparatus 10 succeeds in the matching between the biological information acquired from the user and the biological information read out from the IC chip presented by the user, the gate apparatus 10 determines that the user is in possession of the correct passport. That is, if the gate apparatus 10 determines that the distance between the feature vectors obtained from the above two items of biological information is shorter than a predetermined distance and that the two items of biological information are substantially the same, the gate apparatus 10 determines that the user is in possession of the correct passport.

As described above, according to the second example embodiment, 1-to-1 matching between a face image of a user obtained from the camera device 315 attached to the gate apparatus 10 and a face image read out from an IC chip in a passport presented by the user is performed. As a result of this 1-to-1 matching, if the gate apparatus 10 succeeds in authenticating the user, the gate apparatus 10 determines that the user is in possession of the correct passport. That is, according to the first example embodiment, a problem is caused if there is an inconsistency in gate user information registered in the matching server 20. However, according to the second example embodiment, since the gate apparatus 10 performs final authentication processing on users, users who are not supposed to pass through the gate apparatus 10 are prevented from passing through the gate apparatus 10. According to the second example embodiment, after the matching server 20 performs 1-to-N matching, the gate apparatus 10 performs 1-to-1 matching. In this way, it is guaranteed that the users who pass through the gate apparatus 10 possess their correct passports (their own passports).

[Variation]

The configurations, operations, etc. of the immigration examination systems according to the above example embodiments have been described as examples, and the above description is not intended to limit the system configurations, etc.

For example, the functions of the matching server 20 may entirely or partially be realized by the gate apparatus 10. Alternatively, the gate user database of the matching server 20 may be established in a different database server.

The above example embodiment describes a case in which the gate apparatus 10 is used at immigration examination, but the gate apparatus 10 may also be used at emigration examination. In addition, the above example embodiment describes a case in which the gate apparatus 10 installed in Japan does not collect fingerprints from Japanese. However, the disclosure of the present application is of course applicable to immigration examinations outside of Japan. For example, the disclosure of the present application can be applied in cases where users of nationality A are exempted from fingerprinting, while users of nationality B are required to be fingerprinted. That is, the disclosure of the present application is applicable when the examination content (fingerprint collection is not required, fingerprint collection is required) changes according to the nationality of the examination target user for emigration and immigration examination.

In the above example embodiments, transmission and reception of a feature vector calculated from a face image are performed between the gate apparatus 10 and the matching server 20. However, a face image may be transmitted from the gate apparatus 10 to the matching server 20. In this case, a matching request including a face image is transmitted from the gate apparatus 10 to the matching server 20, and the matching server 20 calculates a feature vector from the received face image and performs 1-to-N matching. Alternatively, a face image, not a feature vector, may be registered in the user information database of the matching server 20, and feature values may be calculated each time matching is performed.

The example embodiments assume that a single image includes a single face area. However, depending on the situation of the examination place, a single image could include a plurality of face areas. In this case, the matching server 20 may extract a face area closest thereto and may transmit the corresponding biological information to the matching server 20. For example, the matching server 20 may calculate the area of the individual face area and extract a face area having the largest area. Alternatively, for example, a depth camera that can measure the distance in the depth direction may be adopted as the camera device 315. In this case, the camera device 315 may measure the distance therefrom and may extract a face image of a person closest thereto.

In the above example embodiment, the gate apparatus 10 obtains the nationality of the user from the MRZ information obtained from the matching server 20. However, the gate apparatus 10 may directly obtain the nationality of the user from the MRZ of the passport.

In the above example embodiment, operations of the gate apparatuses 10 and the matching server 20 have been described assuming that "faces" are mainly used as the biological information. However, the biological information that can be used in the present application is not limited to "faces". Other biological information such as irises may be used.

The data transmission and reception modes among the gate apparatuses 10 and the matching server 20 are not limited to any particular modes, and the data transmitted and received among these apparatuses may be encrypted. The face images and the feature values calculated from these face images are personal information, and to appropriately protect the personal information, it is desirable that encrypted data be transmitted and received.

The above example embodiments have been described based on a case where information is acquired from IC chips in passports by using MRZ information. However, the technique according to the present application is also applicable to other methods. That is, information corresponding to MRZ information may be used to read out information from an IC chip mounted such as a card similar to a passport.

In the above example embodiment, the management server 30 sends "setting switchover notifications" only to the gate apparatuses 10 that switch operating modes. However, the management server 30 may determine the operating mode of each of the gate apparatuses 10 and send an "operating mode notification" to each of the gate apparatuses 10. When the operating mode set for each the gate apparatus 10 differs from the operating mode notified by the management server 30, the gate apparatus 10 may switch to the operating mode notified by the management server 30.

In the above example embodiment, each of the gate apparatuses 10 in the system is assumed to support a plurality of examination modes (Japanese examination mode and foreigner examination mode). However, the system may include gate apparatuses with fixed examination mode (gate apparatuses that cannot be set to the plurality of examination modes). In other words, the management server 30 does not need to treat all gate apparatuses in the system as subject to a change of operating mode. That is, existing gate apparatuses 10 can be incorporated into the system. Alternatively, even if each of the gate apparatuses 10 in the system supports the plurality of examination modes, the management server 30 may target only a predetermined number of the gate apparatuses 10 to change their operating mode. For example, a system includes ten gate apparatuses 10, but the management server 30 may limit the number of the gate apparatus 10 that can change their operating mode to five gate apparatuses. As a result, a predetermined number of each of the gate apparatuses 10 for Japanese examination mode and the gate apparatuses 10 for foreigner examination mode can be obtained. The minimum number of gate apparatuses 10 for each examination mode can be obtained regardless of the user ratio.

In the above example embodiment, the management server 30 sets each of the gate apparatuses 10 in the immigration examination system as a target for setting the operating mode. However, the management server 30 may manage a plurality of the gate apparatuses 10 as a group and set the operating mode for each group.

When the management server 30 selects the gate apparatuses 10 to switch operating modes, the management server 30 may refer to location information (placement information) of the gate apparatuses 10 operating in each operation mode. For example, the management server 30 may select the operating mode of the gate apparatus 10 so that the gate apparatuses 10 with different operating modes are adjacent to each other. Specifically, the management server 30 may determine the operating mode so that the gate apparatus 10 in the Japanese operating mode is next to the gate apparatus 10 in the foreign operating mode. Alternatively, the management server 30 may determine the operating mode so that the gate apparatuses 10 in the same operating mode are gathered. For example, the management server 30 may determine the operating mode so that the gate apparatuses 10 in the Japanese examination mode are gathered on the left side, viewed from an entrance to the examination area. The management server 30 may determine the operating mode so that the gate apparatuses 10 in the foreigner operating mode are gathered on the right side.

The above example embodiment describes a case in which the traveler information of each user is entered into the management server 30. However, the traveler information may be entered into the management server 30 collectively for each flight. More specifically, an airline server located at the departure airport may compile and transmit traveler information regarding passengers on departing aircraft to the management server 30.

In the above example embodiment, the management server 30 determines the nationality of the users arriving at the airport prior to the timing for calculating the user ratio and determines the operating mode of the gate apparatus 10. That is, the management server 30 determines the operating mode of the gate apparatus 10 based on an actual number of users arriving at the airport. However, the management server 30 may determine the operating mode of the gate apparatus 10 based on a number of users expected to arrive at the airport. That is, the management server 30 may estimate the users who will be present in the airport after a predetermined period of time from the timing for calculating the user ratio, and determine the operating mode based on the nationality of the guessed users. In this case, the management server 30 determines the nationality of the passengers on the aircraft arriving in the future from the "arrival date and time" of the traveler database shown in FIG. 7, calculates the user ratio, and determines the operating mode of the gate apparatus 10. Alternatively, if the management server 30 obtains information that the aircraft is delayed, the management server 30 may modify (update) the arrival date and time based on the delay information and calculate the user ratio.

Figure 17:
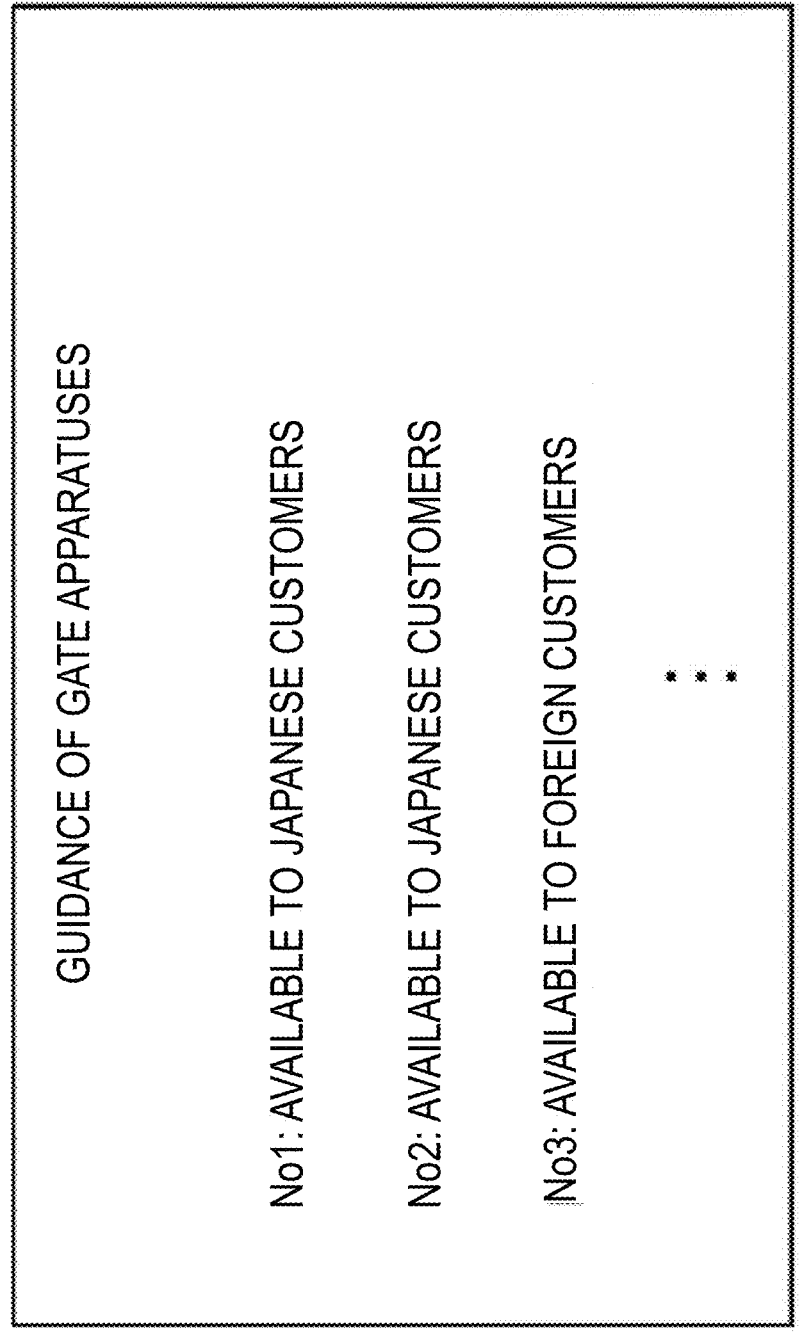
FIG. 17 is a diagram illustrating an example of display of a digital signage.

In the above example embodiment, each of the gate apparatuses 10 makes its operating mode known by displaying its own operating mode. However, a bulletin board (digital signage) may be installed near the entrance to the immigration examination area, and the operating mode of each of the gate apparatuses 10 may be displayed on the bulletin board. In this case, the digital signage displays information identifying the gate apparatus 10 (for example, an apparatus number) with the operating mode of the gate apparatus 10 (FIG. 17). In addition, it is desirable to switch the language to be used (for example, Japanese, English, Chinese) at predetermined intervals so that both Japanese and foreigners can understand the display shown in FIG. 17. Information (operating mode of each the gate apparatus 10), which is the basis for display on digital signage, may be transmitted from the management server 30. Alternatively, this information may be transmitted from each the gate apparatus 10.

Alternatively, the digital signage can be equipped with facial authentication. Specifically, the digital signage sends a matching request to the matching server 20 as well as the gate apparatus 10. The digital signage obtains the MRZ information from the matching server 20 and uses the MRZ information to determine the nationality of the user in front of the digital signage. The digital signage provides information about the gate apparatus 10 according to the nationality determined. For example, the digital signage highlights the display of the gate apparatuses 10 that are available for use by the user in front of the digital signage. Alternatively, the digital signage removes indications about the gate apparatus 10 that are not available for use by the user in front of the digital signage.

A level of congestion in the airport may be reflected in determining the operating mode of the gate apparatus 10. For example, the operating mode of the gate apparatuses 10 may be determined based on the user ratio when the total number of users in a predetermined period exceeds a predetermined value. If the total number of users is less than the predetermined value, the operating mode of the gate apparatuses 10 may be fixed. Alternatively, the operating mode of the gate apparatuses 10 may be set so that both Japanese and foreigners can be examined. The level of congestion can be calculated based on the actual number of passengers arriving at the airport based on flight information, or based on the estimated arrival date and time based on delay information, etc.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to immigration examination systems at airports.

A part or the entirety of the example embodiments described above may be described as in the following supplementary notes, but is not limited to the followings.

[Supplementary Note 1]

A gate apparatus, including:
 a communication unit that communicates with a management server, which calculates a ratio of users of a first nationality in a total number of users undergoing emigration and immigration examination and determines an operating mode of a gate apparatus based on the calculated ratio of users; and
 a switching unit that switches an operating mode for emigration and immigration examination of an examination target user to the operating mode determined by the management server.

[Supplementary Note 2]

The gate apparatus according to supplementary note 1, further including:
 a gate control unit that controls a gate, if the examination target user passes the emigration and immigration examination, so that the examination target user can pass through the gate.

[Supplementary Note 3]

The gate apparatus according to supplementary note 1 or 2, further including:
 an announce unit that informs a user of the operating mode of own apparatus.

[Supplementary Note 4]

The gate apparatus according to any one of supplementary notes 1 to 3, wherein a first operating mode for emigration and immigration examination of users of the first nationality and a second operating mode for emigration and immigration examination of users of a second nationality are settable.

[Supplementary Note 5]

The gate apparatus according to supplementary note 4, further including:
 a nationality determination unit that determines a nationality of the examination target user, wherein
 an emigration and immigration of the examination target user is denied if the nationality of the examination target user obtained when operating in the first operating mode is the second nationality.

[Supplementary Note 6]

A management server, calculating a ratio of users of a first nationality in a total number of users undergoing emigration and immigration examination; determining an operating mode of at least one or more gate apparatus based on the calculated ratio of users; and notifying the at least one or more gate apparatus of the determined operating mode.

[Supplementary Note 7]

An emigration and immigration examination system, including:
 at least one or more gate apparatus that examines emigration and immigration of users; and
 a management server that calculates a ratio of users of a first nationality in a total number of users undergoing emigration and immigration examination, and determines an operating mode of the at least one or more gate apparatus based on the calculated ratio of users, wherein
 the management server notifies the at least one or more gate apparatus of the determined operating mode; and
 the gate apparatus examines the emigration and immigration of an examination target user in the notified operating mode.

[Supplementary Note 8]

The emigration and immigration examination system according to supplementary note 7, wherein the at least one or more gate apparatus controls a gate, if the examination target user passes the immigration examination, so that the examination target user can pass through the gate.

[Supplementary Note 9]

The emigration and immigration examination system according to supplementary note 7 or 8, wherein the at least one or more gate apparatus informs a user of the operating mode of own apparatus.

[Supplementary Note 10]

The emigration and immigration examination system according to any one of supplementary notes 7 to 9, wherein the at least one or more gate apparatus is settable with a first operating mode for emigration and immigration examination of users of the first nationality and a second operating mode for emigration and immigration examination of users of a second nationality.

[Supplementary Note 11]

The emigration and immigration examination system according to supplementary note 10, wherein the at least one or more gate apparatus determines a nationality of the examination target user, and denies an emigration and immigration of the examination target user if the nationality of the examination target user determined when operating in the first operating mode is the second nationality.

[Supplementary Note 12]

An emigration and immigration examination method in a system including at least one or more gate apparatus that examines emigration and immigration of users and a management server connected to the at least one or more gate apparatus, the emigration and immigration examination method including:

calculating a ratio of users of a first nationality in a total number of users undergoing emigration and immigration examination, and determining an operating mode of the at least one or more gate apparatus based on the calculated ratio or users;

notifying the at least one or more gate apparatus of the determined operating mode; and examining the emigration and immigration of an examination target user in the notified operating mode.

The supplementary notes 11 and 12 can be expanded in the same way as the supplementary note 1 can be expanded into the supplementary note 2 to the supplementary note 5.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST 10, 10-1 to 10-3, 100 gate apparatus
20 matching server
30 management server
101 communication unit
102 switching unit
201, 301, 401 communication control unit
202 user information registration unit
203 first matching unit
204, 305, 410 storage unit
211, 311 processor
212, 312 memory
213 input-output interface
214, 314, communication interface
302 traveler information acquisition unit
303 user ratio calculation unit
304 operating mode determination unit
313 input-output device
315 camera device
316 reader
317 fingerprint scanner
318 gate
402 operating mode switching unit
403 operating mode announce unit
404 biological information acquisition unit
405 matching request unit
406 passport possession determination unit
407 nationality determination unit
408 fingerprint acquisition unit
409 gate control unit
411 second matching unit

What is claimed is:

1. A gate apparatus, comprising:
at least one memory storing a set of instructions; and
at least one processor configured to execute the set of instructions to:
communicate with a management server, which calculates a ratio of users of a first nationality in a total number of users undergoing emigration and immigration examination and determines an operating mode of the gate apparatus based on the calculated ratio of users; and
switch an operating mode of the gate apparatus for emigration and immigration examination of an examination target user included in the users, to the operating mode determined by the management server.

2. The gate apparatus according to claim 1, wherein the at least one processor is further configured to execute the set of instructions to:
control a gate of the gate apparatus, if the examination target user passes the emigration and immigration examination, so that the examination target user can pass through the gate.

3. The gate apparatus according to claim 1, wherein the at least one processor is further configured to execute the set of instructions to:
inform a user of the gate apparatus included in the users, of the operating mode of the gate apparatus.

4. The gate apparatus according to claim 1, wherein the operating mode is switchable between a first operating mode and a second operating mode, and
wherein the first operating mode is for emigration and immigration examination of the users of the first nationality and the second operating mode is for emigration and immigration examination of the users of a second nationality.

5. The gate apparatus according to claim 4, wherein the at least one processor is further configured to execute the set of instructions to:
determine a nationality of the examination target user, wherein
the emigration and immigration of the examination target user is denied if the nationality of the examination target user is the second nationality and the operating mode of the gate apparatus is the first operating mode for the first nationality.

6. An emigration and immigration examination system comprising:
at least one or more gate apparatuses that examine emigration and immigration of users; and a management server that calculates a ratio of users of a first nationality in a total number of the users undergoing emigration and immigration examination, and determines an operating mode of the at least one or more gate apparatuses based on the calculated ratio of users, wherein the management server notifies the at least one or more gate apparatus of the determined operating mode; and each of the at least one or more gate apparatuses examines the emigration and immigration of an examination target user included in the users, in the notified operating mode.

7. The emigration and immigration examination system according to claim 6, wherein each of the at least one or more gate apparatuses controls a gate, if the examination target user passes the emigration and immigration examination, so that the examination target user can pass through the gate.

8. The emigration and immigration examination system according to claim 6, wherein each of the at least one or more gate apparatuses informs a user of the gate apparatus included in the users, of the operating mode.

9. The emigration and immigration examination system according to claim 6, wherein the operating mode is switchable between a first operating mode and a second operating mode, and wherein the first operating mode is for emigration and immigration examination of the users of the first nationality and the second operating mode is for emigration and immigration examination of the users of a second nationality.

10. The emigration and immigration examination system according to claim 9, wherein each of the at least one or more gate apparatus determines a nationality of the examination target user, and denies the emigration and immigration of the examination target user if the nationality of the examination target user is the second nationality and the operating mode is the first operating mode for the first nationality.

11. An emigration and immigration examination method in a system including a gate apparatus that examines emigration and immigration of users and a management server connected to the at least one or more gate apparatus, the emigration and immigration examination method comprising:

calculating, by the management server, a ratio of users of a first nationality in a total number of the users undergoing emigration and immigration examination, and determining an operating mode of the gate apparatus based on the calculated ratio of users;

notifying, by the management server, the gate apparatus of the determined operating mode; and examining, by the gate apparatus, the emigration and immigration of an examination target user included in the users, in the notified operating mode.

* * * * *